(12) United States Patent
Tsuchizawa et al.

(10) Patent No.: US 10,793,224 B2
(45) Date of Patent: Oct. 6, 2020

(54) BICYCLE CONTROL DEVICE AND BICYCLE DRIVING DEVICE INCLUDING BICYCLE CONTROL DEVICE

(71) Applicant: Shimano Inc., Sakai, Osaka (JP)

(72) Inventors: Yasuhiro Tsuchizawa, Osaka (JP); Hiroshi Matsuda, Osaka (JP); Takuya Katsuki, Osaka (JP)

(73) Assignee: Shimano Inc., Osaka (JP)

( * ) Notice: Subject to any disclaimer, the term of this patent is extended or adjusted under 35 U.S.C. 154(b) by 256 days.

(21) Appl. No.: 15/906,598

(22) Filed: Feb. 27, 2018

(65) Prior Publication Data

US 2018/0257743 A1    Sep. 13, 2018

(30) Foreign Application Priority Data

Mar. 10, 2017   (JP) .................................. 2017-046083

(51) Int. Cl.
| | | |
|---|---|---|
| *B62M 25/08* | (2006.01) | |
| *B62M 6/50* | (2010.01) | |
| *B62J 99/00* | (2020.01) | |
| *B62J 45/20* | (2020.01) | |
| *B62J 45/40* | (2020.01) | |

(52) U.S. Cl.
CPC .............. *B62M 25/08* (2013.01); *B62J 99/00* (2013.01); *B62M 6/50* (2013.01); *B62J 45/20* (2020.02); *B62J 45/40* (2020.02)

(58) Field of Classification Search
CPC . B62M 25/08; B62M 6/50; B62J 99/00; B62J 2099/0013; B62J 2099/002
See application file for complete search history.

(56) References Cited

U.S. PATENT DOCUMENTS

| | | | | |
|---|---|---|---|---|
| 6,320,336 | B1 | 11/2001 | Eguchi | |
| 6,446,745 | B1 * | 9/2002 | Lee | ........................... B60L 1/14 |
| | | | | 180/206.2 |
| 9,611,002 | B1 * | 4/2017 | Shum | ....................... B62M 6/50 |
| 2002/0120382 | A1 * | 8/2002 | Hatanaka | ................. B62M 6/45 |
| | | | | 701/70 |
| 2010/0113072 | A1 * | 5/2010 | Gibson | ............... G06Q 20/045 |
| | | | | 455/466 |
| 2010/0191582 | A1 * | 7/2010 | Dicker | ................... G06Q 30/02 |
| | | | | 705/14.51 |

(Continued)

FOREIGN PATENT DOCUMENTS

| | | |
|---|---|---|
| CN | 103359250 A | 10/2003 |
| CN | 1715134 A | 1/2006 |

(Continued)

*Primary Examiner* — Hussein Elchanti

(74) *Attorney, Agent, or Firm* — Global IP Counselors, LLP

(57) ABSTRACT

A bicycle control device is configured to appropriately control a motor. The bicycle control device is provided in a bicycle driving device. A bicycle control device includes an electronic controller that controls a motor, which assists with propulsion of a bicycle. In a case where a traveling speed of the bicycle is less than or equal to a predetermined speed, the electronic controller controls the motor so that the motor assists with propulsion of the bicycle. The predetermined speed is changed in accordance with at least one of a usage environment of the bicycle and a posture of the bicycle.

20 Claims, 9 Drawing Sheets

(56) References Cited

U.S. PATENT DOCUMENTS

| | | | | |
|---|---|---|---|---|
| 2011/0160945 A1* | 6/2011 | Gale | ................... | B60L 3/0023 |
| | | | | 701/22 |
| 2014/0100896 A1* | 4/2014 | Du | ...................... | G06Q 10/02 |
| | | | | 705/5 |
| 2014/0235383 A1* | 8/2014 | Wesling | .................. | F16H 9/06 |
| | | | | 474/80 |
| 2015/0124093 A1* | 5/2015 | Wang | ................ | G06K 9/00812 |
| | | | | 348/148 |
| 2015/0134371 A1* | 5/2015 | Shivakumar | .......... | G06Q 10/02 |
| | | | | 705/5 |
| 2016/0375955 A1* | 12/2016 | Negoro | .................. | B62M 6/70 |
| | | | | 701/22 |
| 2017/0178034 A1* | 6/2017 | Skeen | .................. | G06F 16/168 |

FOREIGN PATENT DOCUMENTS

| | | |
|---|---|---|
| CN | 105564581 A | 5/2016 |
| JP | 11-105776 A | 4/1999 |
| JP | 2000-118477 A | 4/2000 |
| JP | 2001-199378 A | 7/2001 |

\* cited by examiner

BICYCLE CONTROL DEVICE AND BICYCLE DRIVING DEVICE INCLUDING BICYCLE CONTROL DEVICE

CROSS-REFERENCE TO RELATED APPLICATIONS

This application claims priority to Japanese Patent Application No. 2017-046083, filed on Mar. 10, 2017. The entire disclosure of Japanese Patent Application No. 2017-046083 is hereby incorporated herein by reference.

BACKGROUND

Field of the Invention

The present invention generally relates to a bicycle control device and a bicycle driving device that includes the control device.

Background Information

Japanese Laid-Open Patent Publication No. 11-105776 (Patent document 1) discloses a bicycle control device that controls a motor, which assists with propulsion of a bicycle. The bicycle control device of patent document 1 controls the motor so that the traveling speed of the bicycle is set to a predetermined speed or lower.

SUMMARY

An appropriate traveling speed of a bicycle differs from one time to another. However, this point is not considered in the bicycle control device of patent document 1. One object of the present invention is to provide a bicycle control device that is configured to appropriately control a motor and a bicycle driving device that includes the control device.

In accordance with a first aspect of the present invention, a bicycle control device includes an electronic controller that controls a motor, which assists with propulsion of a bicycle. The electronic controller is configured to control the motor so that the motor assists with propulsion of the bicycle in a case where a traveling speed of the bicycle is less than or equal to a predetermined speed. The electronic controller is configured to change the predetermined speed in accordance with at least one of a usage environment of the bicycle and a posture of the bicycle. With the bicycle control device according to the first aspect, the motor is appropriately controlled in accordance with at least one of the usage environment of the bicycle and the posture of the bicycle.

In accordance with a second aspect of the present invention, the bicycle control device according to the first aspect is configured so that the usage environment includes an inclination angle of a road surface on which the bicycle travels. With the bicycle control device according to the second aspect, the motor is appropriately controlled in accordance with the inclination angle of the road surface.

In accordance with a third aspect of the present invention, the bicycle control device according to the second aspect is configured so that the inclination angle of the road surface includes an inclination angle with respect to a horizontal plane in a direction in which the bicycle travels. With the bicycle control device according to the third aspect, the motor is appropriately controlled in accordance with the inclination angle of the road surface in a case the bicycle travels on a slope.

In accordance with a fourth aspect of the present invention, the bicycle control device according to the first aspect is configured so that the posture includes an inclination angle of the bicycle. With the bicycle control device according to the fourth aspect, the motor is appropriately controlled in accordance with the inclination angle of the bicycle.

In accordance with a fifth aspect of the present invention, the bicycle control device according to the fourth aspect is configured so that the inclination angle of the bicycle includes an inclination angle with respect to a horizontal plane in a front-rear direction of the bicycle. With the bicycle control device according to the fifth aspect, the motor is appropriately controlled in accordance with the inclination angle of the bicycle in a case where the bicycle travels on a slope.

In accordance with a sixth aspect of the present invention, the bicycle control device according to the third or fifth aspect is configured so that the electronic controller is configured to lower the predetermined speed in a case where the inclination angle is a predetermined angle that is greater than zero as compared to a case where the inclination angle is zero. With the bicycle control device according to the sixth aspect, in a case where the inclination angle is a predetermined angle that is greater than zero, the traveling speed of the bicycle at which the assisting of the motor is stopped is lowered as compared to a case where the inclination angle is zero.

In accordance with a seventh aspect of the present invention, the bicycle control device according to the third, fifth, or sixth aspect is configured so that the electronic controller is configured to lower the predetermined speed as the inclination angle is increases in a case where the inclination angle is greater than zero. With the bicycle control device according to the seventh aspect, in a case where the inclination angle is greater than zero, the traveling speed of the bicycle at which the assisting of the motor is stopped is lowered as the inclination angle is increased.

In accordance with an eighth aspect of the present invention, the bicycle control device according to any one of the third and fifth to seventh aspects is configured so that the electronic controller is configured to lower the predetermined speed in a case where the inclination angle is a predetermined angle that is less than zero as compared to a case where the inclination angle is zero. With the bicycle control device according to the eighth aspect, in a case where the inclination angle is a predetermined angle that is less than zero, the traveling speed of the bicycle at which the assisting of the motor is stopped is lowered as compared to a case where the inclination angle is zero.

In accordance with a ninth aspect of the present invention, the bicycle control device according to any one of the third and fifth to eighth aspects is configured so that the electronic controller is configured to lower the predetermined speed as the inclination angle is decreases in a case where the inclination angle is less than zero. With the bicycle control device according to the ninth aspect, in a case where the inclination angle is less than zero, the traveling speed of the bicycle at which the assisting of the motor is stopped is lowered as the inclination angle is decreased.

In accordance with a tenth aspect of the present invention, the bicycle control device according to any one of the second to ninth aspects is configured so that the electronic controller is configured to lower the predetermined speed in a case where the inclination angle is a predetermined angle that has an absolute value that is greater than zero as compared to a case where the absolute value of the inclination angle is zero. With the bicycle control device according to the tenth aspect, in a case where the inclination angle is greater than zero and less than zero, the traveling speed of the bicycle at which the assisting of the motor is stopped is lowered as compared to a case where the inclination angle is zero.

In accordance with an eleventh aspect of the present invention, the bicycle control device according to any one of the second to tenth aspects is configured so that the electronic controller is configured to lower the predetermined speed as an absolute value of the inclination angle increases in a case where the absolute value of the inclination angle is greater than zero. With the bicycle control device according to the eleventh aspect, in a case the inclination angle is greater than zero, the traveling speed of the bicycle at which the assisting of the motor is stopped is lowered as the inclination angle is increased. Also, in a case the inclination angle is less than zero, the traveling speed of the bicycle at which the assisting of the motor is stopped is lowered as the inclination angle is decreased.

In accordance with a twelfth aspect of the present invention, the bicycle control device according to the tenth or eleventh aspect is configured so that the electronic controller is configured to set the predetermined speed corresponding to the absolute value of the inclination angle to at least partially differs between a case where the inclination angle is greater than zero as compared to a case where the inclination angle is less than zero. With the bicycle control device according to the twelfth aspect, the motor is controlled in accordance with each of a case where the inclination angle is greater than zero and a case where the inclination angle is less than zero.

In accordance with a thirteenth aspect of the present invention, the bicycle control device according to any one of the first to twelfth aspects further includes a detection unit configured to detects at least one of the usage environment and the posture of the bicycle. The electronic controller is configured to change the predetermined speed in accordance with an output of the detection unit. With the bicycle control device according to the thirteenth aspect, the detection unit allows the electronic controller to appropriately change the predetermined speed.

In accordance with a fourteenth aspect of the present invention, the bicycle control device according to the thirteenth aspect is configured so that the detection unit includes an inclination sensor that is configured to detect an inclination angle of the bicycle. With the bicycle control device according to the fourteenth aspect, the inclination sensor appropriately detects the inclination angle of the bicycle.

In accordance with a fifteenth aspect of the present invention, the bicycle control device according to the fourteenth aspect is configured so that the inclination sensor is configured to detect a pitch angle of the bicycle. With the bicycle control device according to the fifteenth aspect, the electronic controller controls the motor in accordance with the pitch angle.

In accordance with a sixteenth aspect of the present invention, the bicycle control device according to any one of the first to fifteenth aspects is configured so that the electronic controller is configured to control the motor in a walk mode, in which walking of the bicycle is assisted. The electronic controller is configured to control the motor so that the motor assists with walking of the bicycle in a case where a traveling speed of the bicycle is less than or equal to the predetermined speed in the walk mode. With the bicycle control device according to the sixteenth aspect, in the walk mode, the electronic controller controls the motor in accordance with at least one of the usage environment of the bicycle and the posture of the bicycle.

In accordance with a seventeenth aspect of the present invention, the bicycle control device according to any one of the first to fifteenth aspects is configured so that the electronic controller is configured to control the motor in an assist mode, in which propulsion of the bicycle is assisted in accordance with manual driving force that is input to the bicycle. The electronic controller is configured to control the motor so that the motor assists with propulsion of the bicycle in a case where a traveling speed of the bicycle is less than or equal to the predetermined speed in the assist mode. With the bicycle control device according to the seventeenth aspect, in the assist mode, the electronic controller controls the motor in accordance with at least one of the usage environment of the bicycle and the posture of the bicycle.

In accordance with an eighteenth aspect of the present invention, a bicycle driving device includes the bicycle control device according to the sixteenth aspect. The bicycle driving device further comprises the motor and a transmission mechanism. The transmission mechanism is configured to transmit a rotational force of the motor to a wheel of the bicycle and also configured to transmit a rotational force of the wheel to the motor. The electronic controller drives the motor so that the motor applies a brake on the bicycle in a case the bicycle is traveling downhill in the walk mode. With the bicycle driving device according to the eighteenth aspect, in a case where the bicycle is traveling downhill in the walk mode, the electronic controller controls the motor to apply a brake on the bicycle. Thus, the traveling speed of the bicycle is limited.

In accordance with a nineteenth aspect of the present invention, a bicycle driving device includes the bicycle control device according to the sixteenth aspect. The bicycle driving device further comprises the motor and a transmission mechanism. The transmission mechanism that transmit a rotational force of the motor to a wheel of the bicycle. The transmission mechanism includes a one-way clutch located in a driving force transmission path that extends between the motor and the wheel. The electronic controller is configured to stop the motor from assisting with walking of the bicycle in a case where the bicycle is traveling downhill in the walk mode. With the bicycle driving device according to the nineteenth aspect, in a case where the bicycle is traveling downhill in the walk mode, the assisting of the motor is stopped. This reduces power consumption.

In accordance with a twentieth aspect of the present invention, a bicycle control device includes an electronic controller that controls a motor, which assists with propulsion of a bicycle. The electronic controller is configured to control the motor so that the motor assists with propulsion of the bicycle in a case where a rotational speed of the motor is less than or equal to a predetermined speed. The electronic controller is configured to change predetermined speed in accordance with at least one of a usage environment of the bicycle and a posture of the bicycle. With the bicycle control device according to the twentieth aspect, in a case where propulsion of the bicycle is assisted, the motor is appropriately controlled in accordance with at least one of the usage environment of the bicycle and the posture of the bicycle.

The bicycle control device and the bicycle driving device that includes the control device according to the present invention appropriately control the motor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
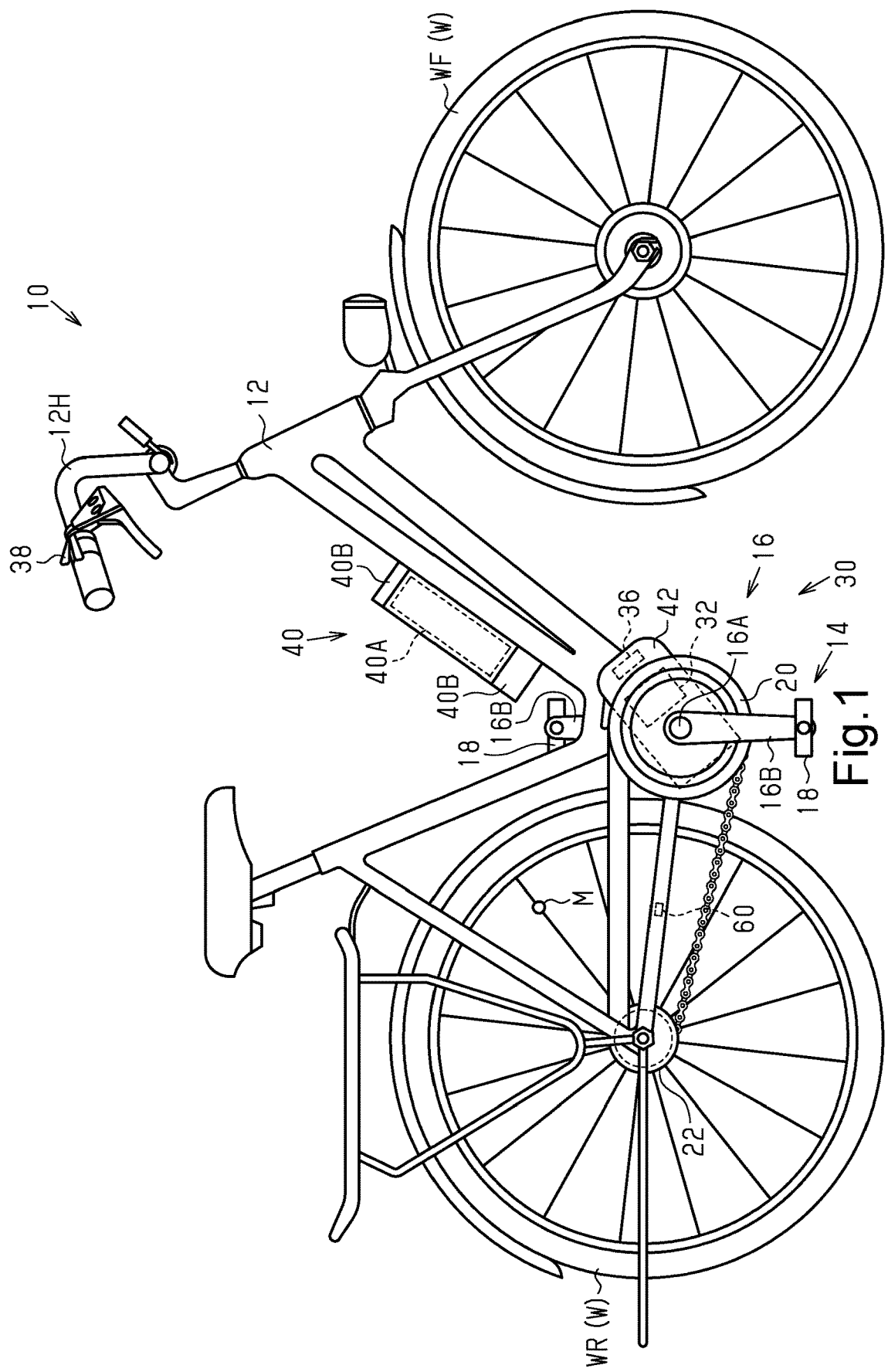
FIG. 1 is a side elevational view of a bicycle equipped with a bicycle driving device having a bicycle control device in accordance with a first embodiment.

As seen in FIG. 1, a bicycle 10 is illustrated that is equipped with a bicycle driving device 30 having a bicycle control device 50 in accordance with a first embodiment. The bicycle control device 50 and the bicycle driving device 30 will now be described with reference to FIG. 1.

The bicycle 10 includes a frame 12, a drive mechanism 14 supported by the frame 12, and the bicycle driving device 30. The drive mechanism 14 includes a crank 16 and a pair of pedals 18. The crank 16 includes a crankshaft 16A and a pair of crank arms 16B. The drive mechanism 14 transmits a manual driving force that is applied to the pedals 18 to a rear wheel WR. The drive mechanism 14 includes a front rotary body 20, which is coupled to the crankshaft 16A by a one-way clutch 44A. The one-way clutch 44A is configured to allow for forward rotation of the front rotary body 20 in a case where the crank 16 is rotated forward. The one-way clutch 44A is configured to prohibit rearward rotation of the front rotary body 20 in a case where the crank 16 is rotated rearward. The one-way clutch 44A can be omitted. The front rotary body 20 includes a sprocket, a pulley or a bevel gear. Here, the front rotary body 20 is a front sprocket as seen in FIG. 1. The front rotary body 20 can be coupled to the crankshaft 16A without a one-way clutch. The drive mechanism 14 is configured to transmit the rotation of the crank 16 to a rear rotary body 22, which is coupled to the rear wheel WR, for example, through a chain, a belt, or a shaft. The rear rotary body 22 includes a sprocket, a pulley, or a bevel gear. Here, the rear rotary body 22 is a rear sprocket as seen in FIG. 1. A one-way clutch 44B is provided between the rear rotary body 22 and the rear wheel WR. The one-way clutch 44B is configured to allow for forward rotation of the rear wheel WR in a case where the rear rotary body 22 is rotated forward and prohibit rearward rotation of the rear rotary body 22 in a case where the rear wheel WR is rotated rearward.

Figure 2:
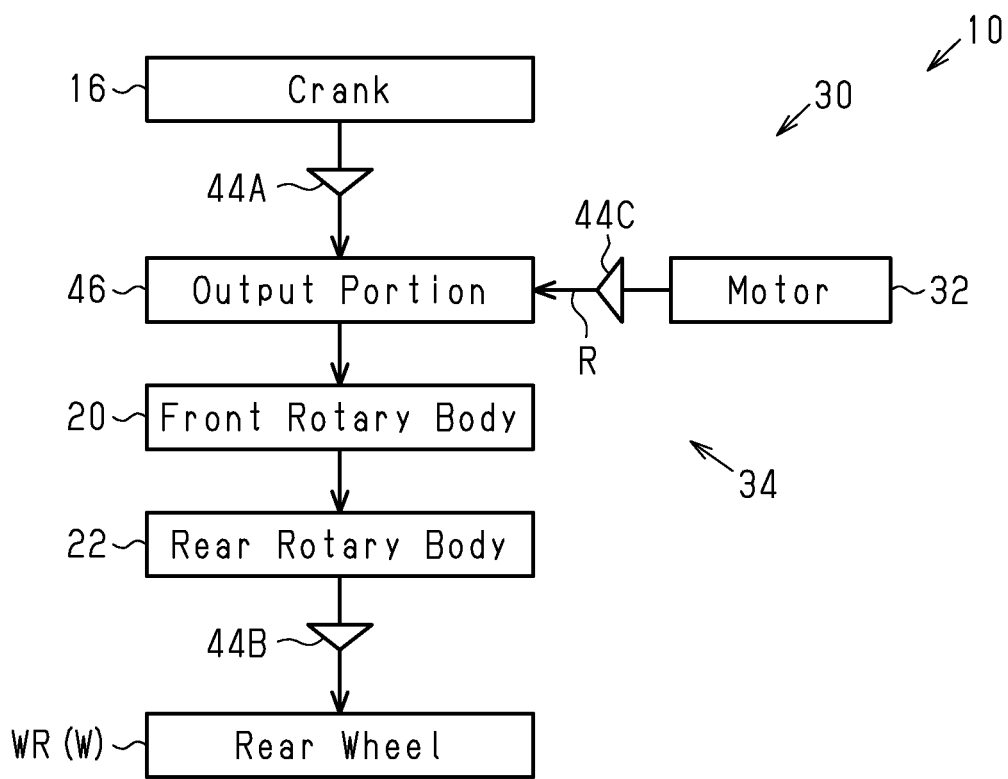
FIG. 2 is a block diagram illustrating a bicycle transmission mechanism of the bicycle of FIG. 1.
Figure 4:
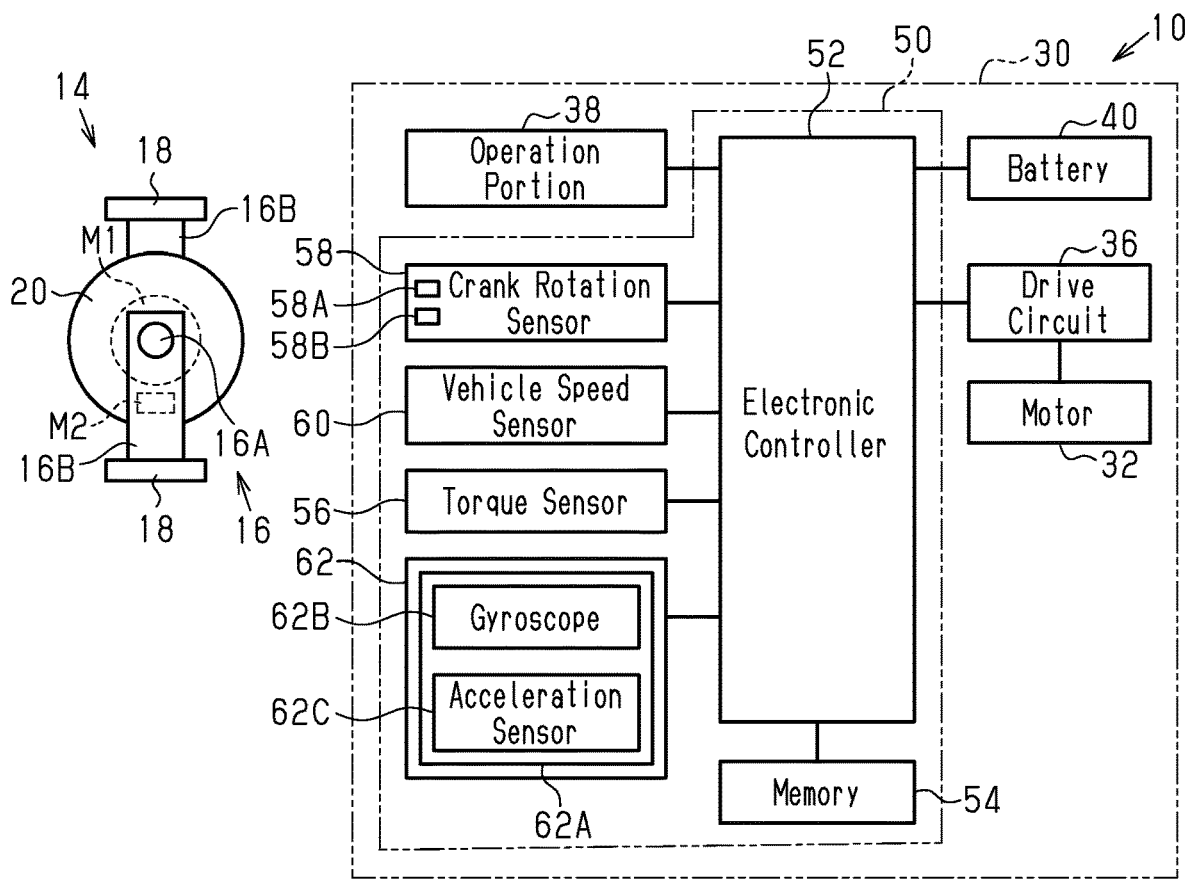
FIG. 4 is a block diagram illustrating an electrical configuration of the bicycle driving device that includes an electronic controller.

As shown in FIG. 2, the bicycle driving device 30 includes the bicycle control device 50, a motor 32 and a transmission mechanism 34. As shown in FIG. 4, the bicycle driving device 30 further includes a drive circuit 36 of the motor 32, an operation portion 38 and a battery 40.

As shown in FIG. 1, the motor 32 and the drive circuit 36 is accommodated in the same housing 42. As shown in FIG. 4, the drive circuit 36 controls power supplied from the battery 40 to the motor 32. The motor 32 assists with propulsion of the bicycle 10. The motor 32 includes an electric motor. The motor 32 is provided to transmit rotation to a manual driving force transmission path extending from the pedals 18 to the rear wheel WR. The motor 32 is coupled to the manual driving force transmission path that extends from the crankshaft 16A to the front rotary body 20. Components other than the motor 32 and the drive circuit 36 can be provided in the housing 42. For example, a reduction gear, which reduces the speed of rotation of the motor 32 and outputs the rotation, can be provided in the housing 42.

As shown in FIG. 2, the transmission mechanism 34 transmits a rotational force of the motor 32 to a wheel W of the bicycle 10. In one example, the transmission mechanism 34 transmits the rotational force of the motor 32 to the rear wheel WR of the bicycle 10. The transmission mechanism 34 includes the one-way clutches 44B and 44C in a driving force transmission path R that extends between the motor 32 and the wheel W. The one-way clutch 44C is provided so that the motor 32 will not be rotated by the rotational force of the crank 16 in a case where the wheels W are rotated in a direction in which the bicycle 10 is moved rearward and in a case where the crankshaft 16A is rotated in a direction in which the bicycle 10 is moved forward. In one example, the one-way clutch 44C is provided between the motor 32 and an output portion 46. The output portion 46 couples the crankshaft 16A and the front rotary body 20. At least one of the one-way clutches 44B and 44C can be omitted.

Figure 3:
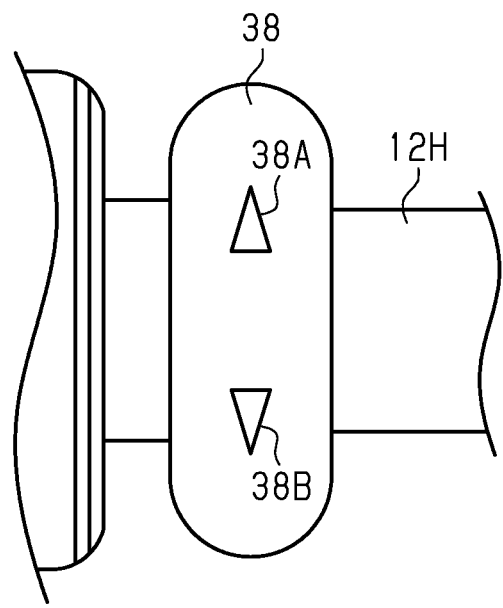
FIG. 3 is a top plan view of an operation portion (i.e., a shifter) for operating the bicycle driving device of FIG. 1.

The operation portion 38, which is shown in FIG. 3, is operable by the rider. In the illustrated embodiment, the operation portion 38 constitutes a shifter in that a rider operated to shift a mode of operation of the motor 32 as explained below. The operation portion 38 is coupled to a handlebar 12H of the bicycle 10. The operation portion 38 is communicable with an electronic controller 52 of the bicycle control device 50. The operation portion 38 is connected to the electronic controller 52 to perform wired or wireless communication with the electronic controller 52. The operation portion 38 is communicable with the electronic controller 52, for example, through power line communication (PLC). If the rider operates the operation portion 38, then the operation portion 38 transmits an output signal to the electronic controller 52. The operation portion 38 includes a first switch 38A and a second switch 38B. The first switch 38A and second switch 38B are operated to switch an assist mode of the motor 32. The operation portion 38 includes, for example, an operation member, a sensor and an electric circuit. The operation member includes the first switch 38A and the second switch 38B. The sensor detects movement of the operation member. The electric circuit that performs communication with the electronic controller 52 in accordance with an output signal of the sensor (not shown).

The battery 40, which is shown in FIG. 1, includes a battery unit 40A, which includes one or more battery cells, and a battery holder 40B, which supports the battery unit 40A. The battery cell includes a rechargeable battery. The battery 40 supplies power to other electric components, which are mounted on the bicycle 10 and electrically connected to the battery 40 by wire, such as the motor 32 and the bicycle control device 50.

As shown in FIG. 4, the bicycle control device 50 includes the electronic controller 52. In one example, it is preferred that the bicycle control device 50 further include a memory 54, a torque sensor 56, a crank rotation sensor 58, a vehicle speed sensor 60 and a detection unit 62.

The torque sensor 56 outputs a signal corresponding to manual driving force TA. The torque sensor 56 detects the manual driving force TA, which is input to the drive mechanism 14 via the pedals 18. The torque sensor 56 can be provided in the transmission path of the manual driving force TA extending from the crankshaft 16A to the front rotary body 20 or on one of the crankshaft 16A and the front rotary body 20. Alternatively, the torque sensor 56 can be provided on one of the crank arms 16B and the pedals 18. The torque sensor 56 can be realized, for example, by a strain sensor, a magnetostriction sensor, an optical sensor, or a pressure sensor. Any sensor can be used as long as the sensor outputs a signal corresponding to the manual driving force TA applied to the crank arms 16B or the pedals 18.

The crank rotation sensor 58 detects a rotational angle CA of the crank 16. The crank rotation sensor 58 is attached to the frame 12 of the bicycle 10 or the housing 42 of the motor 32. The crank rotation sensor 58 includes a first element 58A and a second element 58B. The first element 58A detects the magnetic field of a first magnet M1. The second element 58B outputs a signal corresponding to the positional relationship with a second magnet M2. The first magnet M1 is provided on one of the crankshaft 16A and the crank arms 16B. The first magnet M1 is provided coaxial with the crankshaft 16A. The first magnet M1 is an annular magnet having a plurality of magnetic poles alternately located next to one another in a circumferential direction. The first element 58A detects the rotational angle of the crank 16 with respect to the frame 12. In a case where the crank 16 rotates once, the first element 58A outputs a signal, one cycle of which corresponds to the angle obtained by dividing 360 degrees by the number of the same magnetic poles. The minimum value of the rotational angle of the crank 16 that can be detected by the crank rotation sensor 58 is 180 degrees or less. The minimum value is preferably 15 degrees, and is more preferably 6 degrees. The second magnet M2 is provided on one of the crankshaft 16A and the crank arms 16B. The second element 58B detects the reference angle of the crank 16 with respect to the frame 12 (e.g., top dead center or bottom dead center of crank 16). The second element 58B outputs a signal, one cycle of which corresponds to one rotation of the crankshaft 16A.

The crank rotation sensor 58 can include a magnetic sensor that outputs a signal corresponding to the strength of the magnetic field instead of the first element 58A and the second element 58B. In this case, instead of the first magnet M1 and the second magnet M2, an annular magnet having the magnetic field that changes in strength in the circumferential direction, is coaxially provided on the crankshaft 16A. If a magnetic sensor that outputs a signal corresponding to the strength of the magnetic field is used, then a rotational speed N of the crank 16 and the rotational angle of the crank 16 can be detected by a single sensor. This simplifies the structure and facilitates the assembling. The crank rotation sensor 58 can detect the rotational speed N of the crank 16 in addition to the rotational angle CA of the crank 16. The rotational speed N of the crank 16 can be detected using any one of the output of the first element 58A, the output of the second element 58B, and the output of the magnetic sensor.

The vehicle speed sensor 60 detects the rotational speed of the wheel W. The vehicle speed sensor 60 is electrically connected to the electronic controller 52 with or without wires. As shown in FIG. 1, the vehicle speed sensor 60 is attached to a chainstay of the frame 12. The vehicle speed sensor 60 outputs a signal to the electronic controller 52 in accordance with changes in the relative position of a magnet M attached to the rear wheel WR and the vehicle speed sensor 60. It is preferred that the vehicle speed sensor 60 include a magnetic reed, which forms a reed switch, or a Hall element.

The detection unit 62, which is shown in FIG. 4, detects at least one of the usage environment and the posture of the bicycle 10. The posture includes an inclination angle DA of the bicycle 10. The inclination angle DA of the bicycle 10 includes an inclination angle DA with respect to a horizontal plane in a front-rear direction of the bicycle 10. The detection unit 62 includes an inclination sensor 62A, which detects the inclination angle DA of the bicycle 10. The inclination sensor 62A detects the pitch angle of the bicycle 10. It is preferred that the inclination sensor 62A be configured to additionally detect the roll angle and the yaw angle of the bicycle 10. The inclination sensor 62A is provided on the frame 12 (refer to FIG. 1) or the housing 42 in which the motor 32 is provided. The housing 42, which rotatably supports the crank 16, is attached to the frame 12. The inclination sensor 62A is connected to the electronic controller 52 to perform wired or wireless communication with the electronic controller 52. The inclination sensor 62A includes at least one of a three-axis gyroscope 62B and a three-axis acceleration sensor 62C. An output of the inclination sensor 62A includes information of the posture angle with respect to each of the three axes and the acceleration with respect to each of the three axes. The posture angles with respect to the three axes are the pitch angle, the roll angle, and the yaw angle. It is preferred that the three axes of the gyroscope 62B conform to the three axes of the acceleration sensor 62C. It is preferred that the inclination sensor 62A be attached to the frame 12 or the housing 42 so that the sideward direction of the bicycle 10 of FIG. 1 substantially conforms to the direction in which the axis corresponding to the pitch angle extends.

The electronic controller 52 includes an arithmetic processing device that executes predetermined control programs. The arithmetic processing device includes, for example, a central processing unit (CPU) or a micro processing unit (MPU) that includes at least one processor. The electronic controller 52 can include one or more microcomputers having a processor. The electronic controller 52 further includes a timer. The memory 54 is any computer storage device or any computer readable medium with the sole exception of a transitory, propagating signal. The memory 54 stores information used in various kinds of control programs and various kinds of control processes. The memory 54 includes, for example, a nonvolatile memory and a volatile memory, and can includes a ROM (Read Only Memory) device, a RAM (Random Access Memory) device, a hard disk, a flash drive, etc. The electronic controller 52 and the memory 54 are accommodated, for example, in the housing 42.

The electronic controller 52 calculates a traveling speed V of the bicycle 10 based on the output of the vehicle speed sensor 60. The electronic controller 52 calculates the inclination angle DA of the bicycle 10 based on at least the output of the inclination sensor 62A. The inclination angle DA is an inclination angle of the bicycle 10 in the front-rear direction about the axis that extends in the sideward direction of the bicycle 10. More specifically, the inclination angle DA is the pitch angle of the bicycle 10. The inclination angle DA is set to be zero degrees in a state where the bicycle 10 is located on a level place. Thus, the inclination angle DA is correlated with the gradient of the road surface on which the bicycle 10 travels.

The electronic controller 52 calculates the pitch angle, the roll angle, and the yaw angle from the output of the gyroscope 62B. The electronic controller 52 calculates a first acceleration vector from output of the acceleration sensor 62C with respect to the front-rear direction of the bicycle 10. The electronic controller 52 calculates a second acceleration vector from the output of the vehicle speed sensor 60. The electronic controller 52 corrects the pitch angle, the roll angle and the yaw angle based on the first acceleration vector and the second acceleration vector to reduce errors included in the pitch angle, the roll angle and the yaw angle. More specifically, the electronic controller 52 calculates correction angles for each of the pitch angle, the roll angle and the yaw angle based on the difference between the first acceleration vector and the second acceleration vector. The electronic controller 52 adds the correction angles to the pitch angle, the roll angle and the yaw angle, respectively. The electronic controller 52 calculates the inclination angle DA based on the corrected pitch angle, the corrected roll angle, the corrected yaw angle and an initial value of the inclination angle of the bicycle 10. In a case where the inclination sensor 62A is attached to the bicycle 10 so that the sideward direction of the bicycle 10 substantially conforms to the direction in which the axis corresponding to the pitch angle extends, the inclination angle DA can be calculated based on the pitch angle, the roll angle and the initial value of the inclination angle of the bicycle 10. In a case where the inclination sensor 62A is attached to the bicycle 10 so that the sideward direction of the bicycle 10 substantially conforms to the direction in which the axis corresponding to the pitch angle extends and the front-rear direction of the bicycle 10 substantially conforms to the axis of the roll angle, the inclination angle DA can be calculated based on the pitch angle and the initial value of the inclination angle of the bicycle 10.

The electronic controller 52 controls the motor 32. In a case where the traveling speed V of the bicycle 10 is less than or equal to a predetermined speed VX, the electronic controller 52 is configured (programmed) to control the motor 32 so that the motor 32 assists with propulsion of the bicycle 10. The electronic controller 52 is configured to control the motor 32 in an assist mode, in which propulsion of the bicycle 10 is assisted in accordance with the manual driving force TA that is input to the bicycle 10. The electronic controller 52 is configured to control the motor 32 in a walk mode, in which walking of the bicycle 10 is assisted by the output force of the motor 32. The electronic controller 52 switches between the assist mode and the walk mode based on at least one of an operation of the operation portion 38 and outputs of various sensors.

The predetermined speed VX includes a first predetermined speed VX1 and a second predetermined speed VX2. The first predetermined speed VX1 is appropriate to the assist mode. The second predetermined speed VX2 is appropriate to the walk mode. The first and second predetermined speeds VX1 and VX2 can be more simply referred to as predetermined speeds. In the assist mode, in a case where the traveling speed V of the bicycle 10 is less than or equal to the first predetermined speed VX1, the electronic controller 52 controls the motor 32 so that the motor 32 assists with propulsion of the bicycle 10. One example of the first predetermined speed VX1 is 25 km per hour. In the walk mode, in a case where the traveling speed V of the bicycle 10 is less than or equal to the second predetermined speed VX2, the electronic controller 52 controls the motor 32 so that the motor 32 assists with walking of the bicycle 10.

In the assist mode, the electronic controller 52 drives the motor 32 in accordance with the manual driving force TA. The assist mode includes multiple assist modes, which differ from one another in the output ratio of the motor 32 to the manual driving force TA (hereafter, referred to as "assist ratio"). The assist mode also includes an OFF mode in which the motor 32 is not driven. If the first switch 38A of the operation portion 38 of FIG. 3 is operated in the OFF mode, then the electronic controller 52 is switched to the assist mode having the lowest assist ratio. If the first switch 38A of the operation portion 38 is operated in one of the assist modes, then the electronic controller 52 is switched to the assist mode having the next higher assist ratio. If the first switch 38A of the operation portion 38 is operated in the assist mode having the highest assist ratio, then the electronic controller 52 maintains the assist mode, which has the highest assist ratio. If the second switch 38B of the operation portion 38 is operated in the OFF mode, the electronic controller 52 is switched from the assist mode to the walk mode. If the second switch 38B of the operation portion 38 is operated in one of the assist modes, then the electronic controller 52 is switched to the assist mode having the next lower assist ratio. If the second switch 38B of the operation portion 38 is operated in the assist mode having the lowest assist ratio, then the electronic controller 52 is switched to the OFF mode. The assist mode can include one assist mode and the OFF mode. Alternatively, the assist mode can include only one assist mode. The electronic controller 52 can be switched to the walk mode if the second switch 38B of the operation portion 38 is operated for a predetermined time or longer in one of the assist modes excluding the OFF mode. A display (not shown), which is provided on the handlebar 12H, indicates the operation mode that is currently selected from the multiple assist modes and the walk mode.

In the walk mode, the electronic controller 52 is configured to drive the motor 32 so that the motor 32 assists with walking of the bicycle 10. The walk mode includes a wait mode, in which the motor 32 is not driven, and a drive mode, in which the motor 32 is driven. In the walk mode, the electronic controller 52 is configured to drive the motor 32 in a state where the manual driving force TA is not input to the crank 16. Switching from the assist mode to the walk mode sets the electronic controller 52 to the wait mode. If the second switch 38B is operated in the wait mode, then the electronic controller 52 is switched from the wait mode to the drive mode. While the second switch 38B continues being pressed in the walk mode, the electronic controller 52 maintains the drive mode to drive the motor 32 as long as the driving of the motor 32 does not need to be stopped in accordance with inputs from various sensors and the first switch 38A is not operated. The various sensors include the vehicle speed sensor 60, the torque sensor 56, and the crank rotation sensor 58. In a state where the second switch 38B is operated to maintain the drive mode, if the operation of the second switch 38B is cancelled, the electronic controller 52 is switched from the drive mode to the wait mode. In a state where the second switch 38B is operated to maintain the drive mode, if the driving of the motor 32 needs to be stopped in accordance with the input from the various sensors or the first switch 38A is operated, the electronic controller 52 is switched from the drive mode to the wait mode. If the operation mode is switched from the drive mode to the wait mode in a state where the second switch 38B is operated, then the electronic controller 52 can be again switched from the wait mode to the drive mode by temporarily canceling the operation of the second switch 38B and again operating the second switch 38B. In the walk mode, the electronic controller 52 determines that the driving of the motor 32 needs to be stopped if the traveling speed V of the bicycle 10, which is detected by the vehicle speed sensor 60, exceeds the second predetermined speed VX2. In the walk mode, the electronic controller 52 determines that the driving of the motor 32 needs to be stopped if the manual driving force TA, which is detected by the torque sensor 56, becomes greater than or equal to a predetermined value. In the walk mode, the electronic controller 52 determines that the driving of the motor 32 needs to be stopped if the crank rotation sensor 58 detects rotation of the crank 16. At least one of the control for stopping the driving of the motor 32 based on the manual driving force TA, which is detected by the torque sensor 56, and the control for stopping the driving of the motor 32 based on the rotation of the crank 16, which is detected by the crank rotation sensor 58, can be omitted from the walk mode.

Figure 5:
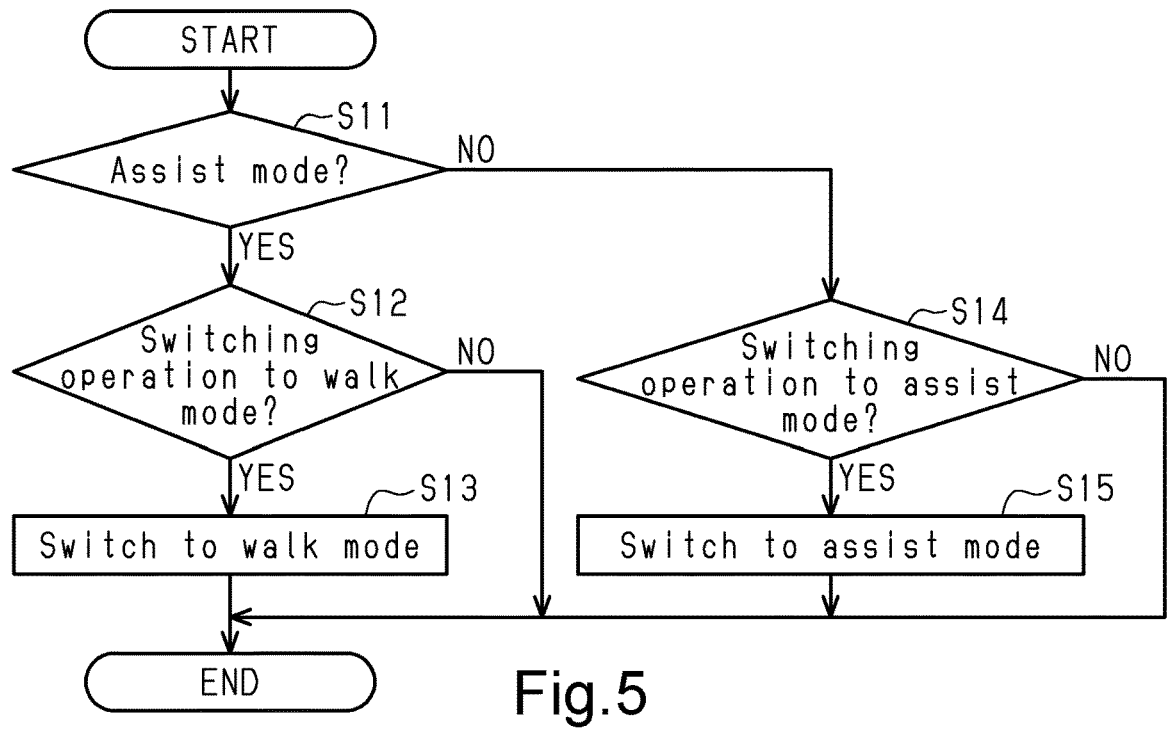
FIG. 5 is a flowchart for performing a switching control that is executed by the electronic controller of FIG. 4.

The switching control for switching between the assist mode and the walk mode will now be described with reference to FIG. 5. If the first switch 38A or the second switch 38B is operated, the electronic controller 52 is switched between the assist mode and the walk mode. In a case where the bicycle control device 50 is activated, the switching control is repeatedly executed. If the bicycle control device 50 is deactivated, then the switching control is stopped.

In step S11, the electronic controller 52 determines whether or not the current mode is the assist mode. If the electronic controller 52 determines that the current mode is the assist mode, then the electronic controller 52 proceeds to step S12. In step S12, the electronic controller 52 determines whether or not an operation for switching to the walk mode is performed. More specifically, if the second switch 38B of the operation portion 38 is operated in the OFF mode of the assist modes, then the electronic controller 52 determines that the operation for switching to the walk mode is performed. The electronic controller 52 can determine that the operation for switching to the walk mode is performed if the second switch 38B of the operation portion 38 is operated for a predetermined time or longer in one of the assist modes excluding the OFF mode.

If the electronic controller 52 determines that the operation for switching to the walk mode is not performed, then the process is ended. If the electronic controller 52 determines that the operation for switching to the walk mode is performed, then the electronic controller 52 is switched from the assist mode to the walk mode in step S13 and ends the process.

If the electronic controller 52 determines in step S11 that the current mode is not assist mode, that is, the current mode is the walk mode, then the electronic controller 52 proceeds to step S14 and determines whether or not an operation for switching to the assist mode is performed. More specifically, the electronic controller 52 determines that the operation for switching to the assist mode is performed if the first switch 38A of the operation portion 38 is operated in the wait mode of the walk mode. The electronic controller 52 can determine that the operation for switching to the assist mode is performed if the first switch 38A of the operation portion 38 is operated for a predetermined time or longer in the wait mode of the walk mode. If the electronic controller 52 determines that the operation for switching to the assist mode is not performed, then the electronic controller 52 ends the process. If the electronic controller 52 determines that the operation for switching to the assist mode is performed, then the electronic controller 52 is switched from the walk mode to the assist mode in step S15 and ends the process.

The electronic controller 52 changes the second predetermined speed VX2 in accordance with an output of the detection unit 62. The second predetermined speed VX2 is changed in accordance with at least one of the usage environment of the bicycle 10 and the posture of the bicycle 10. The usage environment includes the inclination angle DA of a road surface on which the bicycle 10 travels. The inclination angle DA of the road surface includes an inclination angle DA with respect to a level surface in a direction in which the bicycle 10 travels. The memory 54 stores information that specifies the relationship between the inclination angle DA and the second predetermined speed VX2. The information specifying the relationship between the inclination angle DA and the second predetermined speed VX2 includes, for example, a map, a table or a relational expression using a function. The electronic controller 52 sets the second predetermined speed VX2 in accordance with the output of the detection unit 62 and the information, which specifies the relationship between the inclination angle DA and the second predetermined speed VX2 stored in the memory 54. The memory 54 can store a plurality of maps, a plurality of tables, or a plurality of relational expressions. In this case, the electronic controller 52 can select one from the maps, the tables, or the relational expressions in accordance with the inclination angle DA and other conditions to set the second predetermined speed VX2. In another example, the user can select one from the maps, the tables, or the relational expressions in advance using the operation portion 38 or an external device.

In a case where the inclination angle DA is a predetermined angle that is greater than zero, the second predetermined speed VX2 is lower than a case where the inclination angle DA is zero. In a case where the inclination angle DA is greater than zero, the second predetermined speed VX2 is lowered as the inclination angle DA is increased. Chart 1 shows a first example of a table that specifies the relationship between the inclination angle DA and the second predetermined speed VX2. In chart 1, the predetermined angle of the inclination angle DA that is greater than zero includes any value that is 2 degrees or greater.

CHART 1

| Inclination Angle DA (degree) | Predetermined Speed VX2 (km/h) |
| --- | --- |
| 0 ≤ DA < 2 | 5 |
| 2 ≤ DA < 4 | 4 |
| 4 ≤ DA < 6 | 3 |
| 6 ≤ DA < 8 | 2 |
| 8 ≤ DA | 1 |

In a case where the inclination angle DA is a predetermined angle that is less than zero, the second predetermined speed VX2 is lower than a case where the inclination angle DA is zero. In a case where the inclination angle DA is less than zero, the second predetermined speed VX2 is lowered as the inclination angle DA is decreased. Chart 2 shows a second example of a table that specifies the relationship between the inclination angle DA and the second predetermined speed VX2. Chart 3 shows a third example of a table that specifies the relationship between the inclination angle DA and the second predetermined speed VX2. In charts 2 and 3, the predetermined angle of the inclination angle DA that is less than zero includes any value that is less than −2 degrees.

CHART 2

| Inclination Angle DA (degree) | Predetermined Speed VX2 (km/h) |
| --- | --- |
| −2 ≤ DA < 0 | 5 |
| −4 ≤ DA < −2 | 4 |
| −6 ≤ DA < −4 | 3 |
| −8 ≤ DA < −6 | 2 |
| DA < −8 | 0 |

CHART 3

| Inclination Angle DA (degree) | Predetermined Speed VX2 (km/h) |
| --- | --- |
| −2 ≤ DA < 0 | 5 |
| −4 ≤ DA < −2 | 4.5 |
| −6 ≤ DA < −4 | 4 |
| −8 ≤ DA < −6 | 3.5 |
| DA < −8 | 0 |

Figure 6:
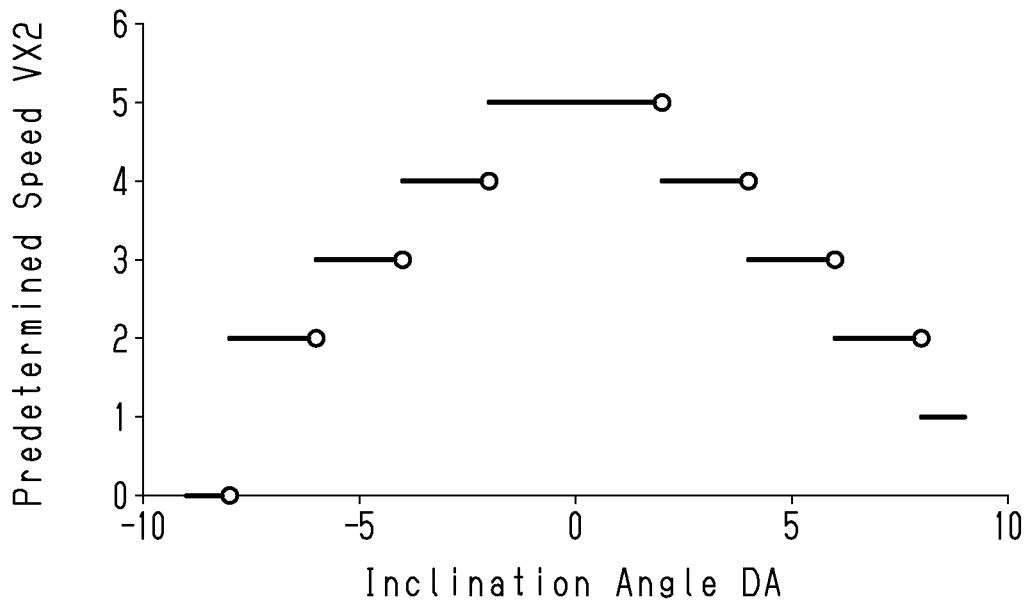
FIG. 6 is a map illustrating a first example used by the electronic controller of FIG. 4 showing a relationship between an inclination angle of the bicycle and a predetermined speed for the bicycle.
Figure 7:
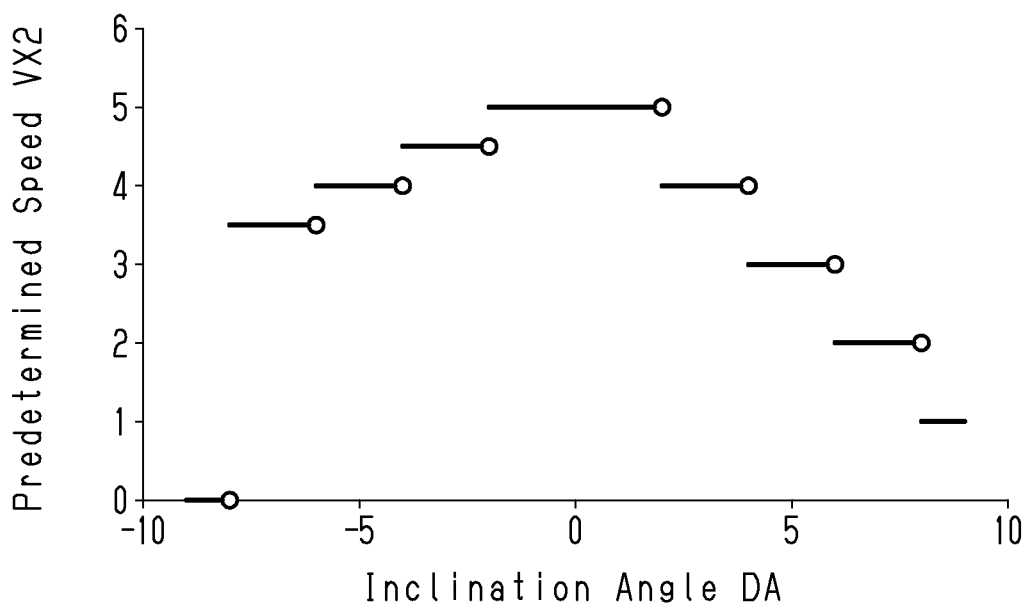
FIG. 7 is a map illustrating a second example used by the electronic controller of FIG. 4 showing the relationship between the inclination angle and the predetermined speed.

In a case where the inclination angle DA is a predetermined angle and has an absolute value that is greater than zero, the second predetermined speed VX2 is lower than a case where the absolute value of the inclination angle DA is zero. In a case where the absolute value of the inclination angle DA is greater than zero, the second predetermined speed VX2 is lowered as the absolute value of the inclination angle DA is increased. FIGS. 6 and 7 each show one example of a map that specifies the relationship between the inclination angle DA and the second predetermined speed VX2. The map of FIG. 6 corresponds to a table that combines chart 1 and chart 2. The map of FIG. 7 corresponds to a table that combines chart 1 and chart 3. In FIG. 6, regardless of the inclination angles DA being greater than zero or less than zero, in a case where the inclination angles DA have the same absolute value, the second predetermined speed VX2 is the same in a range from −8 degrees to +8 degrees of the inclination angle DA excluding boundary values of the inclination angles DA. In FIG. 7, the second predetermined speeds VX2 corresponding to the absolute values of the inclination angles DA at least partially differ between a case where the inclination angle DA is greater than zero and a case where the inclination angle DA is less than zero. In FIGS. 6 and 7, the predetermined angles corresponding to the absolute values of the inclination angles DA of that are greater than zero include any value that is 2 degrees or greater and less than −2 degrees.

In a case where the bicycle 10 travels downhill in the walk mode, the electronic controller 52 can stop the motor 32 from assisting with the walking of the bicycle 10. In one example, in a case where the bicycle 10 is traveling downhill in the walk mode, the electronic controller 52 sets the second predetermined speed VX2 to zero to stop the driving of the motor 32 and the assisting with the walking of the bicycle 10.

The control for driving the motor 32 in the walk mode will now be described with reference to FIG. 8. The electronic controller 52 executes the driving control in predetermined cycles during the walk mode. The electronic controller 52 stops the driving control if at least one predetermined condition is satisfied. The predetermined condition is satisfied in at least one of a case where the walk mode is changed to the assist mode, a case where the bicycle control device 50 is changed from activation to deactivation, and a case where the traveling speed V of the bicycle 10 exceeds the second predetermined speed VX2. The predetermined condition can be satisfied in at least one of a case where the manual driving force TA, which is detected by the torque sensor 56, becomes greater than or equal to the predetermined value and a case where the crank rotation sensor 58 detects rotation of the crank 16.

In step S21, the electronic controller 52 determines whether or not a request for starting to drive the motor 32 is made in the walk mode. The electronic controller 52 determines that the request for starting to drive the motor 32 is made, for example, if the second switch 38B of the operation portion 38 is operated and the manual driving force TA is not inputted in a state where the current mode is switched to the walk mode by the switching control of FIG. 4. The electronic controller 52 repeats step S21 in predetermined cycles until the electronic controller 52 determines that the request for starting to drive the motor 32 is made.

If the electronic controller 52 determines in step S21 that the request for starting to drive the motor 32 is made in the walk mode, then the electronic controller proceeds to step S22 to obtain the inclination angle DA and then proceeds to step S23. In step S23, the electronic controller 52 sets the second predetermined speed VX2 in accordance with the inclination angle DA, which was obtained in step S22.

After the second predetermined speed VX2 is set in step S23, the electronic controller 52 proceeds to step S24. The electronic controller 52 starts to drive the motor 32 in step S24 and proceeds to step S25. The electronic controller 52 drives the motor 32 so that the traveling speed V of the bicycle 10 is set to the second predetermined speed VX2, which was set in step S23.

In step S25, the electronic controller 52 obtains the inclination angle DA. In step S26, the electronic controller 52 determines whether or not the inclination angle DA, which was obtained in step S25, is less than a predetermined angle DAX. The predetermined angle DAX is a negative value. The predetermined angle DAX is, for example, −8 degrees. The predetermined angle DAX corresponds to a downhill having a large gradient. If the inclination angle DA is greater than the predetermined angle DAX, the electronic controller 52 again sets the second predetermined speed VX2 using the inclination angle DA, which was obtained in step S25, in the same manner as step S23 and proceeds to step S29. If the inclination angle DA is less than the predetermined angle DAX, the electronic controller 52 sets the second predetermined speed VX2 to zero in step S28 and proceeds to step S29.

In step S29, the electronic controller 52 determines whether or not a request for stopping the driving of the motor 32 is made in the walk mode. The electronic controller 52 determines that the request for stopping the driving of the motor 32 is made if at least one stop condition is satisfied. The stop condition is satisfied in at least one of a case where the walk mode is changed to the assist mode and a case where the traveling speed V of the bicycle 10 exceeds the second predetermined speed VX2. The stop condition can be satisfied in at least one of a case where the manual driving force TA, which is detected by the torque sensor 56, becomes greater than or equal to a predetermined value and a case where the crank rotation sensor 58 detects rotation of the crank 16. If the electronic controller 52 determines that the request for stopping the driving of the motor 32 is not made, the electronic controller 52 proceeds to step S25 and repeats steps S25, S26, S27 and S29, or steps S25, S26, S28 and S29. If the electronic controller 52 determines in step S29 that the request for stopping the driving of the motor 32 is made, then the electronic controller 52 stops the driving of the motor 32 in step S30 and ends the process. After a predetermined cycle, the electronic controller 52 again starts the process from step S21.

In a case where the user walks the bicycle 10 on an uphill or a downhill, the bicycle control device 50 reduces the traveling speed V of the bicycle 10 as compared to a case where the user walks the bicycle 10 on a level road surface. This allows the traveling speed V of the bicycle 10 to be set in an appropriate range in accordance with the walking speed of the user.

Second Embodiment

A second embodiment of a bicycle driving device 30A will now be described with reference to FIGS. 4, 9 and 10. The bicycle driving device 30A of the second embodiment is the same as the bicycle driving device 30 of the first embodiment except that the one-way clutches 44B and 44C are omitted from the bicycle driving device 30A. The same reference characters are given to those components that are the same as the corresponding components of the first embodiment. Such components will not be described in detail.

The bicycle driving device 30A of the second embodiment includes the bicycle control device 50, the motor 32, and a transmission mechanism 34A. The bicycle driving device 30A further includes the drive circuit 36 of the motor 32, the operation portion 38, and the battery 40, which are shown in FIG. 4.

Figure 9:
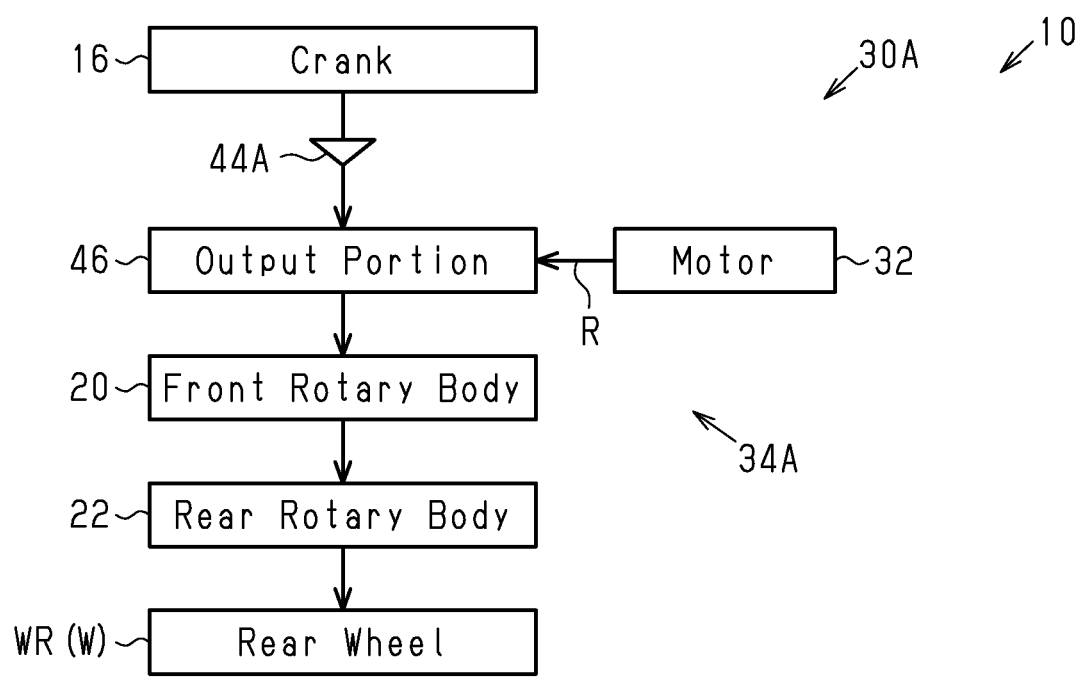
FIG. 9 is a block diagram illustrating a bicycle transmission mechanism used with a bicycle control device in accordance with a second embodiment.

As shown in FIG. 9, the transmission mechanism 34A transmits a rotational force of the motor 32 to the wheel W of the bicycle 10. The transmission mechanism 34A is configured to transmit the rotational force of the motor 32 to the wheel W of the bicycle 10 and also transmit the rotational force of the wheel W to the motor 32. In one example, the transmission mechanism 34A is configured to transmit the rotational force of the motor 32 to the rear wheel WR of the bicycle 10 and transmit rotational force of the rear wheel WR to the motor 32. In the second embodiment, a one-way clutch is not provided between the output portion 46 of the transmission mechanism 34A and the rear wheel WR.

In a case where the bicycle 10 is traveling downhill in the walk mode, the electronic controller 52 (refer to FIG. 4) drives the motor 32 to apply a brake on the bicycle 10. The control for driving the motor 32 in the walk mode will now be described with reference to FIG. 10. The electronic controller 52 executes the driving control in predetermined cycles during the walk mode. The electronic controller 52 stops the driving control if at least one predetermined condition is satisfied. The predetermined condition is satisfied in at least one of a case where the walk mode is changed to the assist mode, a case where the bicycle control device 50 is changed from activation to deactivation, and a case where the traveling speed V of the bicycle 10 exceeds the second predetermined speed VX2. The predetermined condition can be satisfied in at least one of a case where the manual driving force TA, which is detected by the torque sensor 56, becomes greater than or equal to a predetermined value and a case where the crank rotation sensor 58 detects rotation of the crank 16.

Figure 8:
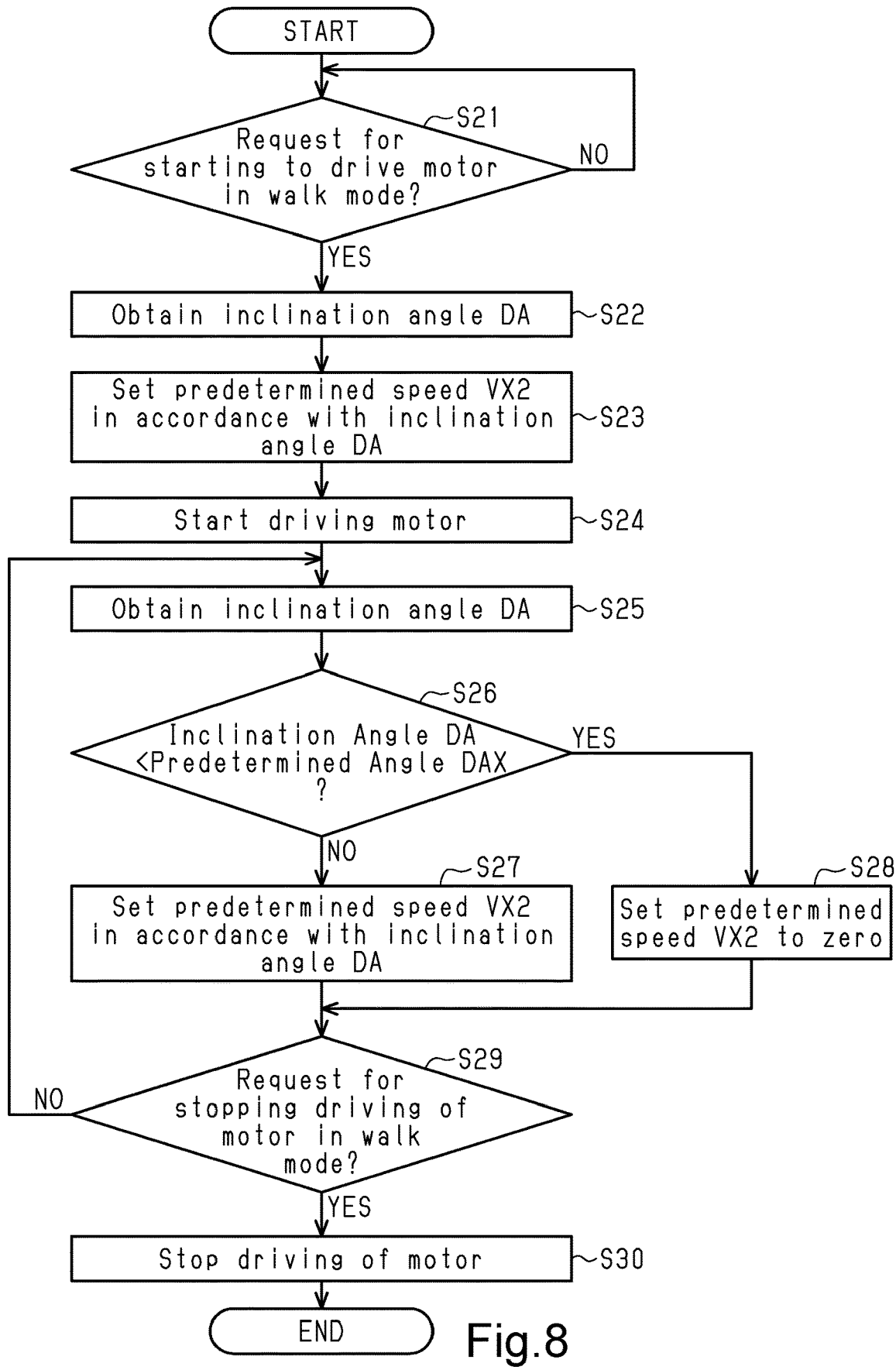
FIG. 8 is a flowchart for performing a motor driving control that is executed by the electronic controller of FIG. 4 in a walk mode.

After the electronic controller 52 performs the same process as in steps S21, S22, S23, and S24 of FIG. 8, the electronic controller 52 proceeds to step S25. In step S25, the electronic controller 52 obtains the inclination angle DA. In step S26, the electronic controller 52 determines whether or not the inclination angle DA, which was obtained in step S25, is less than or equal to the predetermined angle DAX. If the inclination angle DA is greater than the predetermined angle DAX, the electronic controller 52 again sets the second predetermined speed VX2 using the inclination angle DA, which was obtained in step S25, in the same manner as step S23 and proceeds to step S29. If the inclination angle DA is less than or equal to the predetermined angle DAX, the electronic controller 52 executes the braking control of the motor 32 in step S31 and proceeds to step S29. More specifically, the electronic controller 52 controls the motor 32 so that the traveling speed V of the bicycle 10 is set to the second predetermined speed VX2. The braking control of the motor 32 reduces the traveling speed V of the bicycle 10. The electronic controller 52 controls the motor 32 so that the motor 32 functions as a brake. The electronic controller 52 can control the motor 32 so that the motor 32 performs regenerative braking. In this case, power can be stored in the battery 40.

In step S29, the electronic controller 52 determines whether or not a request for stopping the driving of the motor 32 is made in the walk mode. If the electronic controller 52 determines that the request for stopping the driving of the motor 32 is not made, then the electronic controller 52 returns to step S25 and repeats steps S25, S26, S27 and S29, or steps S25, S26, S31 and S29. If the electronic controller 52 determines in step S29 that the request for stopping the driving of the motor 32 is made, then the electronic controller 52 stops the driving of the motor 32 in step S30 and ends the process. After a predetermined cycle, the electronic controller 52 again starts the process from step S21.

Third Embodiment

Figure 11:
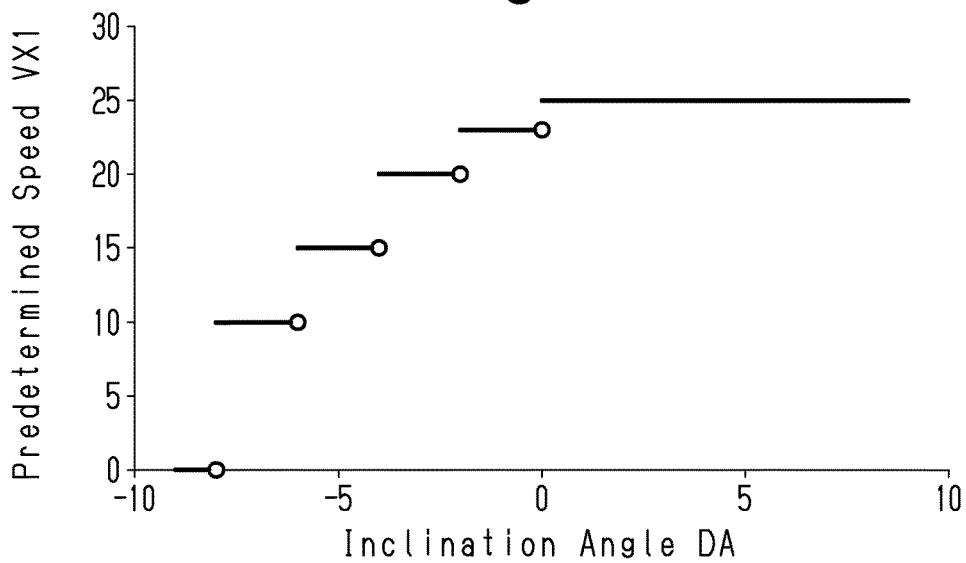
FIG. 11 is a graph illustrating a third example used by the electronic controller of a third embodiment showing the relationship between the inclination angle and the predetermined speed.
Figure 12:
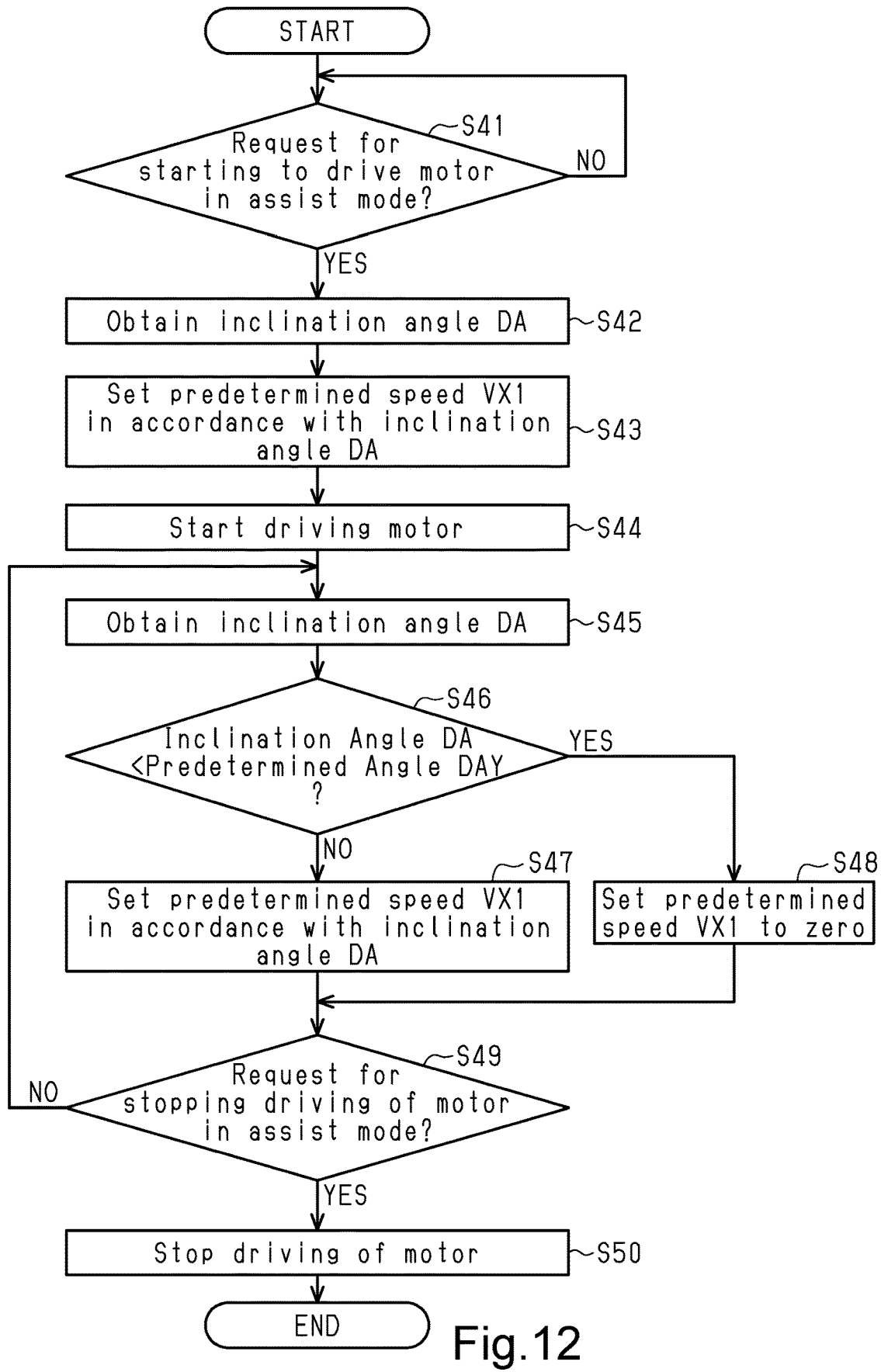
FIG. 12 is a flowchart for performing a motor driving control that is executed by the electronic controller of the third embodiment in an assist mode.

A third embodiment of a bicycle control device 50 will now be described with reference to FIGS. 4, 11 and 12. The bicycle control device 50 of the third embodiment is the same as the bicycle control device 50 of the first embodiment except that the first predetermined speed VX1 is changed based on the inclination angle DA in the assist mode. The same reference characters are given to those components that are the same as the corresponding components of the first embodiment. Such components will not be described in detail.

The electronic controller 52 changes the first predetermined speed VX1 in accordance with an output of the detection unit 62. The first predetermined speed VX1 is changed in accordance with at least one of the usage environment of the bicycle 10 and the posture of the bicycle 10. The usage environment includes an inclination angle DA of the road surface on which the bicycle 10 travels. The inclination angle DA of the road surface includes an inclination angle DA with respect to a horizontal plane in the direction in which the bicycle 10 travels. The memory 54 stores information that specifies the relationship between the inclination angle DA and the first predetermined speed VX1. The information specifying the relationship between the inclination angle DA and the first predetermined speed VX1 includes, for example, a map, a table, or a relational expression using a function. The electronic controller 52 sets the first predetermined speed VX1 in accordance with the output of the detection unit 62 and the information, which specifies the relationship between the inclination angle DA and the first predetermined speed VX1 stored in memory 54.

In a case where the inclination angle DA is greater than zero, the first predetermined speed VX1 is set to a fixed value. In a case where the inclination angle DA is greater than zero, the first predetermined speed VX1 is the same as a case where the inclination angle DA is zero. In a case where the inclination angle DA is a predetermined angle that is less than zero, the first predetermined speed VX1 is lower than a case where the inclination angle DA is zero. In a case where the inclination angle DA is less than zero, the first predetermined speed VX1 is lowered as the inclination angle DA is decreased. Chart 4 shows a first example of a table that specifies the relationship between the inclination angle DA and the first predetermined speed VX1. FIG. 11 is one example of a map that specifies the relationship between the inclination angle DA and the first predetermined speed VX1. The map of FIG. 11 corresponds to chart 4. In FIG. 11, the first predetermined speeds VX1 corresponding to the absolute values of the inclination angle DA differ between a case where the inclination angle DA is greater than zero and a case where the inclination angle DA is less than zero.

In a case where the bicycle 10 is traveling downhill in the assist mode, the electronic controller 52 can stop the motor 32 from assisting with propulsion of the bicycle 10. In one example, in a case where the inclination angle DA is less than zero, the electronic controller 52 sets the first predetermined speed VX1 to zero to stop the driving of the motor 32 and the assisting with the propulsion of the bicycle 10.

CHART 4

| Inclination Angle DA (degree) | Predetermined Speed VX1 (km/h) |
|---|---|
| 0 < DA | 25 |
| −2 ≤ DA < 0 | 23 |
| −4 ≤ DA < −2 | 20 |
| −6 ≤ DA < −4 | 15 |
| −8 ≤ DA < −6 | 10 |

The control for driving the motor 32 in the assist mode will now be described with reference to FIG. 12. The electronic controller 52 executes the driving control in predetermined cycles during the assist mode excluding the OFF mode. The electronic controller 52 stops the driving control if at least one predetermined condition is satisfied. The predetermined condition is satisfied in at least one of a case where the assist mode excluding the OFF mode is changed to the OFF mode, a case where the assist mode is changed to the walk mode, a case where the bicycle control device 50 is changed from activation to deactivation, and a case where the traveling speed V of the bicycle 10 exceeds the first predetermined speed VX1. The predetermined condition can be satisfied in at least one of a case where the crank rotation sensor 58 detects that rotation of the crank 16 is stopped and a case where the manual driving force TA becomes less than a predetermined value.

In step S41, the electronic controller 52 determines whether or not a request for starting to drive the motor 32 is made in the assist mode. The electronic controller 52 determines that the request for starting to drive the motor 32 is made, for example, if the manual driving force TA that is input has the predetermined value or greater in a state where the current mode is switched to one of the assist modes excluding the OFF mode by the switching control of FIG. 4. The electronic controller 52 repeats step S41 in predetermined cycles until the electronic controller 52 determines that the request for starting to drive the motor 32 is made.

If the electronic controller 52 determines in step S41 that the request for starting to drive the motor 32 is made in the assist mode, then the electronic controller 52 proceeds to step S42 to obtain the inclination angle DA and then proceeds to step S43. In step S43, the electronic controller 52 sets the first predetermined speed VX1 in accordance with the inclination angle DA, which was obtained in step S42.

After the first predetermined speed VX1 is set in step S43, the electronic controller 52 proceeds to step S44. The electronic controller 52 starts to drive the motor 32 in step S44 and proceeds to step S45. The electronic controller 52 drives the motor 32 in accordance with the manual driving force TA until the traveling speed V of the bicycle 10 becomes the first predetermined speed VX1 that was set in step S43.

In step S45, the electronic controller 52 obtains the inclination angle DA. In step S46, the electronic controller 52 determines whether or not the inclination angle DA, which was obtained in step S45, is less than a predetermined angle DAY. The predetermined angle DAY is a negative value. The predetermined angle DAY is, for example, −8 degrees. The predetermined angle DAY corresponds to a downhill having a large gradient. If the inclination angle DA is greater than the predetermined angle DAY, the electronic controller 52 again sets the first predetermined speed VX1 using the inclination angle DA, which was obtained in step S45, in the same manner as step S43 and proceeds to step S49. If the inclination angle DA is less than the predetermined angle DAY, then the electronic controller 52 sets the first predetermined speed VX1 to zero in step S48 and proceeds to step S49.

In step S49, the electronic controller 52 determines whether or not a request for stopping the driving of the motor 32 is made in the assist mode. If at least one stop condition is satisfied, the electronic controller 52 determines that the request for stopping the driving of the motor 32 is made. The stop condition is satisfied in at least one of a case where the current mode is changed to the OFF mode, a case where the current mode is changed from the assist mode to the walk mode, and a case where the traveling speed V of the bicycle 10 exceeds the first predetermined speed VX1. The stop condition can be satisfied in at least one of a case where the manual driving force TA, which is detected by the torque sensor 56, becomes less than the predetermined value and a case where the crank rotation sensor 58 detects that rotation of the crank 16 is stopped. If the electronic controller 52 determines that the request for stopping the driving of the motor 32 is not made, then the electronic controller 52 returns to step S45 and repeats steps S45, S46, S47 and S49, or steps S45, S46, S48 and S49. If the electronic controller 52 determines in step S49 that the request for stopping the driving of the motor 32 is made, then the electronic controller 52 stops the driving of the motor 32 in step S50 and ends the process. After a predetermined cycle, the electronic controller 52 again starts the process from step S41.

Modifications

The above description illustrates embodiments of a bicycle control device and a bicycle driving device that includes the control device according to the present invention and is not intended to be restrictive. The embodiments of a bicycle control device and a bicycle driving device that includes the control device according to the present invention can be modified as follows. Further, two or more of the modified examples can be combined. In the modified examples described below, the same reference characters are given to those components that are the same as the corresponding components of the embodiments. Such components will not be described in detail.

In a case where the electronic controller 52 drives the motor 32 in the walk mode, the second predetermined speed VX2 can be set to a fixed value if the inclination angle DA is less than zero. In at least one of steps S23 and S26 of FIGS. 8 and 10, the second predetermined speed VX2 can be set in accordance with the inclination angle DA only if the inclination angle DA is greater than zero. In a case where the second predetermined speed VX2 is not set in steps S23 and S26, the electronic controller 52 controls the motor 32 so as not to exceed a reference predetermined speed VX2 that is stored in the memory 54 in advance.

In a case where the electronic controller 52 drives the motor 32 in the walk mode, the second predetermined speed VX2 can be set to a fixed value if the inclination angle DA is greater than zero. In at least one of steps S23 and S26 of FIGS. 8 and 10, the second predetermined speed VX2 can be set in accordance with the inclination angle DA only if the inclination angle DA is less than zero. In a case where the second predetermined speed VX2 is not set in steps S23 and S26, the electronic controller 52 controls the motor 32 so as not to exceed a reference predetermined speed VX2 that is stored in the memory 54 in advance.

In a case where the electronic controller 52 drives the motor 32 in the walk mode, the second predetermined speed VX2 can be changed based on a roll angle instead of a pitch angle. Chart 5 shows one example of a table that specifies the relationship between the absolute value of the inclination angle DA that includes the roll angle and the second predetermined speed VX2 in the walk mode. In a case where the inclination angle DA is a predetermined angle and has an absolute value that is greater than zero, the second predetermined speed VX2 is lower than a case where the absolute value of the inclination angle DA is zero. It is preferred that in a case where the absolute value of the inclination angle DA is greater than zero, the second predetermined speed VX2 be lowered as the absolute value of the inclination angle DA is increased. In a case where the absolute value of the inclination angle DA is less than or equal to a predetermined value, the second predetermined speed VX2 can be set to a first fixed speed. Additionally, in a case where the absolute value of the inclination angle DA is greater than the predetermined value, the second predetermined speed VX2 can be set to a second fixed speed. Examples of cases where the roll angle of the bicycle 10 is greater than zero include traveling on a mountain trail having an inclined surface with a bank angle and traveling along a curve. The bank angle of the inclined surface corresponds to the usage environment of the bicycle 10. The roll angle of the bicycle 10, which is traveling on an inclined surface having a bank angle or along a curve, with respect to a horizontal plane corresponds to the posture of the bicycle 10. In such a case, the walking speed of the user is reduced as compared a case where the bicycle 10 travels on a flat road surface. Thus, the second predetermined speed VX2 is lowered as the absolute value of the inclination angle DA is increased. This contributes to the usability.

CHART 5

| Inclination Angle \| DA \| (degree) | Predetermined Speed VX2 (km/h) |
| --- | --- |
| 0 ≤ θ < 10 | 5 |
| 10 ≤ θ < 20 | 4 |
| 20 ≤ θ < 30 | 3 |
| 30 ≤ θ | 0 (stop) |

In the third embodiment, the electronic controller 52 can be configured not to change the second predetermined speed VX2 in accordance with the inclination angle DA in the walk mode.

In the third embodiment, in a case where the motor 32 is driven in the assist mode, the first predetermined speed VX1 can be set to a fixed value if the inclination angle DA is less than zero. In the third embodiment, in a case where the motor 32 is driven in the assist mode, the first predetermined speed VX1 can be changed so that the first predetermined speed VX1 is increased as the inclination angle DA is increased in a state the inclination angle DA is greater than zero.

In the third embodiment, in a case where the motor 32 is driven in the assist mode, the first predetermined speed VX1 can be changed based on a roll angle instead of a pitch angle. Chart 6 shows one example of a table that specifies the relationship between the absolute value of the inclination angle DA that includes the roll angle and the first predetermined speed VX1 in the walk mode. In a case where the inclination angle DA is a predetermined angle and has an absolute value that is greater than zero, the first predetermined speed VX1 is lower than a case where the absolute value of the inclination angle DA is zero. In a case where the absolute value of the inclination angle DA is greater than zero, the first predetermined speed VX1 is lowered as the absolute value of the inclination angle DA is increased. In chart 6, a predetermined value of the absolute value of the inclination angle DA that is greater than zero includes any value that is less than −10 degrees or any value that is greater than 10 degrees. In a case where the absolute value of the inclination angle DA is less than or equal to a predetermined value, the first predetermined speed VX1 can be set to a third fixed speed. Additionally, in a case where the absolute value of the inclination angle DA is greater than the predetermined value, the first predetermined speed VX1 can be set to a fourth fixed speed. In one example, the fourth speed includes zero. The third speed includes a value that is greater than the fourth speed. In a case where the fourth speed is zero and the first predetermined speed VX1 is set to the fourth speed, the driving of the motor 32 is stopped. It is preferred that the predetermined value be greater than the absolute value of the predetermined angle. Examples of cases where the roll angle of the bicycle 10 is greater than zero include traveling on a mountain trail having an inclined surface with a bank angle and traveling along a curve. In such a case, the traveling speed V of the bicycle is reduced as compared to a case where the bicycle travels on a flat road surface. Thus, the first predetermined speed VX1 is lowered as the absolute value of the inclination angle DA is increased. This contributes to the usability. In this modified example, the detection unit 62 can be configured to detect the inclination angle DA in one or two directions. The inclination angle DA in one or two directions includes at least the roll angle among the pitch angle, the roll angle, and the yaw angle. In this case, the gyroscope 62B of the inclination sensor 62A can be changed to a one-axis or two-axis gyroscope 62B. Also, the acceleration sensor 62C can be changed to a one-axis or two-axis acceleration sensor 62C.

CHART 6

| Inclination Angle \| DA \| (degree) | Predetermined Speed VX1 (km/h) |
|---|---|
| 0 ≤ θ < 10 | 25 |
| 10 ≤ θ < 20 | 20 |
| 20 ≤ θ < 30 | 15 |
| 30 ≤ θ | 0 (stop) |

In the third embodiment, the first embodiment of the control for driving the motor 32 in the walk mode, which is shown in FIG. 8, can be further executed. Additionally, the transmission mechanism 34 of the third embodiment can be changed to the transmission mechanism 34A of the second embodiment. Then, the second embodiment of the control for driving the motor 32 in the walk mode, which is shown in FIG. 10, can be further executed.

Figure 10:
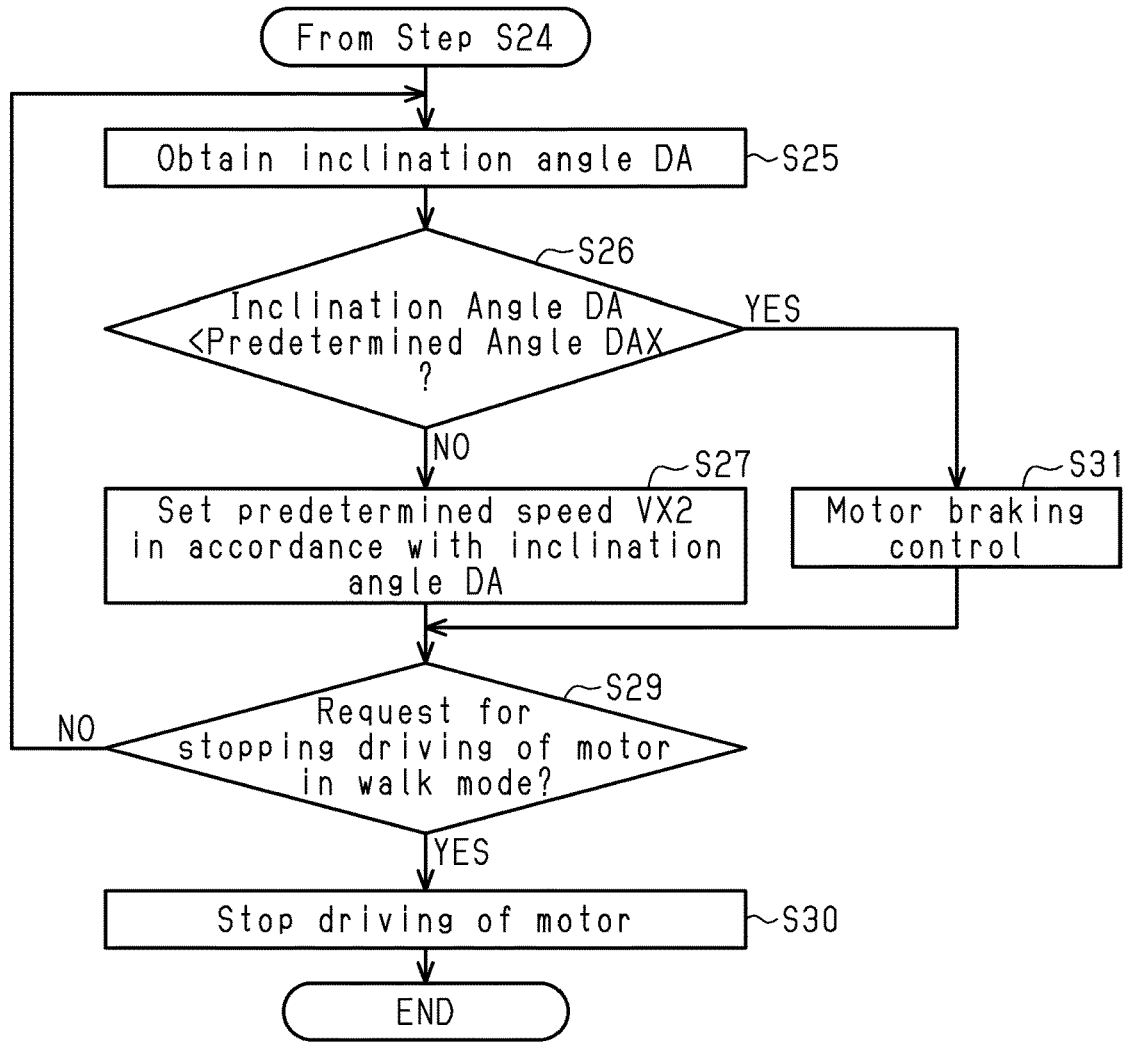
FIG. 10 is a flowchart for performing a motor driving control that is executed by the electronic controller of the second embodiment in the walk mode.

In the bicycle driving device 30A of the second embodiment, the first embodiment of the control for driving the motor 32 in the walk mode, which is shown in FIG. 8, can be executed instead of the control for driving the motor 32 in the walk mode that is shown in FIG. 10.

In the bicycle driving device 30 of the first embodiment, the second embodiment of the control for driving the motor 32 in the walk mode, which is shown in FIG. 10, can be executed instead of the control for driving the motor 32 in the walk mode that is shown in FIG. 8.

In the first and second embodiments, the electronic controller 52 can control the motor 32 so that the motor 32 assists with propulsion of the bicycle 10 if the rotational speed of the motor 32 is less than or equal to a third predetermined speed VX3 in the walk mode. The bicycle control device 50 further includes a rotation sensor that detects the rotational speed of the motor 32. The electronic controller 52 determines the rotational speed of the motor 32 in accordance with a signal from the rotation sensor. The third predetermined speed VX3 is changed in accordance with at least one of the usage environment of the bicycle 10 and the posture of the bicycle. The rotational speed of the motor 32 is proportional to the traveling speed V of the bicycle 10. Thus, the rotational speed of the motor 32 can be used as a control parameter instead of the traveling speed V of the bicycle 10. The electronic controller 52 executes control in which the process for comparing the vehicle speed of the bicycle and the first predetermined speed VX1 in the flowcharts of FIGS. 8 and 10 is replaced by a process for comparing the rotational speed of the motor 32 and the third predetermined speed VX3. Thus, the control will not be described in detail. In a case the driving force transmission path R extending from the motor 32 of the bicycle 10 to the rear wheel WR includes a shifting device, a detection sensor that detects the current shifting stage is provided in the shifting device, a shifting operation device, or a shifting cable. Alternatively, the electronic controller 52 calculates the transmission ratio based on signals from the vehicle speed sensor 60 and the crank rotation sensor 58. The memory 54 stores the third predetermined speed VX3 corresponding to each shifting stage and each transmission ratio. The electronic controller 52 sets the third predetermined speed VX3 corresponding to the detection sensor, which detects the shifting stage, or the calculated transmission ratio.

Figure 13:
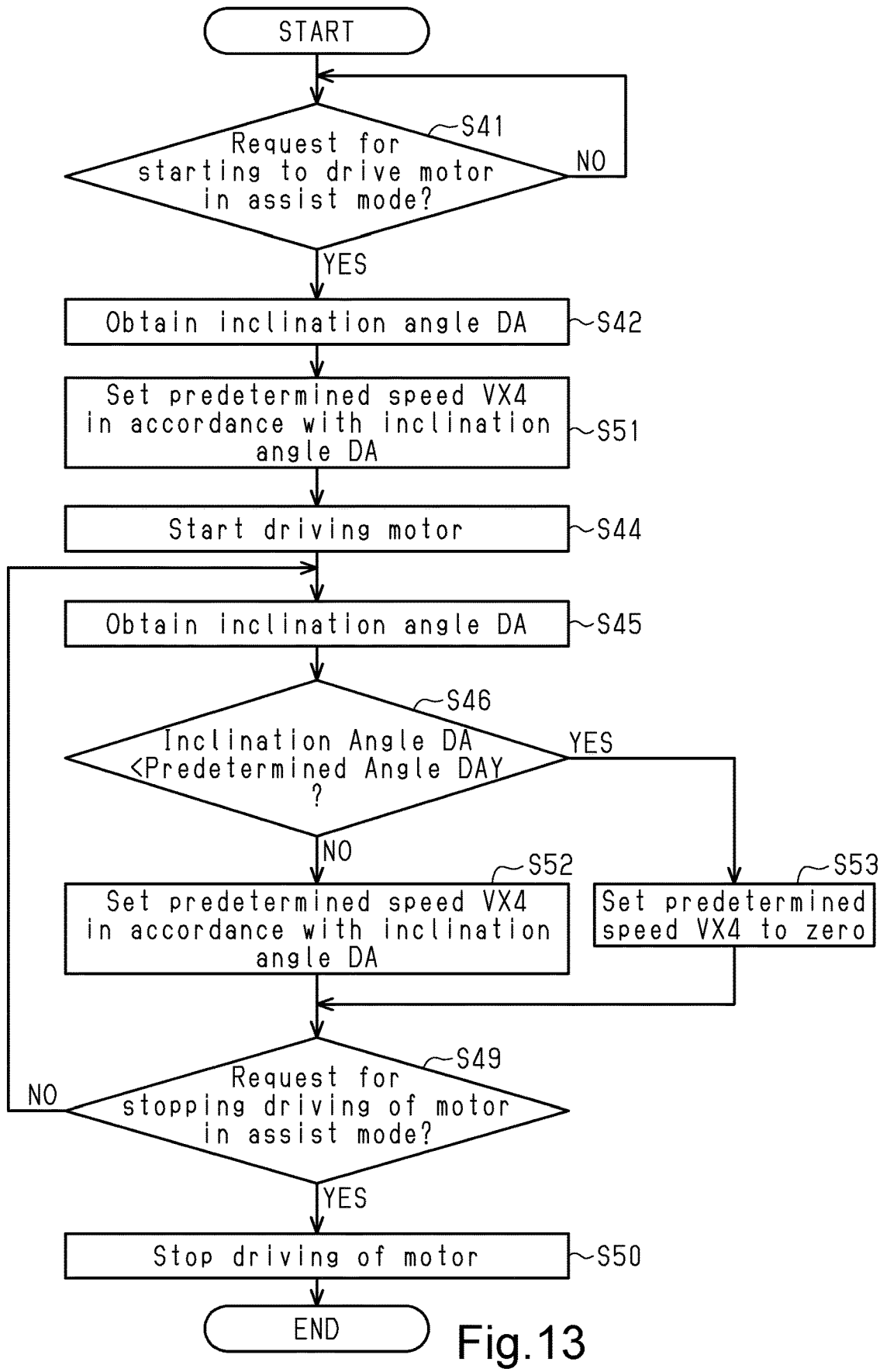
FIG. 13 is a flowchart for performing a motor driving control that is executed by a modified electronic controller in the assist mode.

In the third embodiment, the electronic controller 52 can control the motor 32 so that the motor 32 assists with propulsion of the bicycle 10 in a case where the rotational speed of the motor 32 is less than or equal to a fourth predetermined speed VX4 in the assist mode. The bicycle control device 50 further includes a rotation sensor that detects the rotational speed of the motor 32. The electronic controller 52 determines the rotational speed of the motor 32 in accordance with a signal from the rotation sensor. The fourth predetermined speed VX4 is changed in accordance with at least one of the usage environment of the bicycle 10 and the posture of the bicycle. The fourth predetermined speed VX4 is set to, for example, a value obtained by an inverse operation performed on the first predetermined speed VX1 of chart 1 using the transmission ratio in the driving force transmission path R extending from the motor 32 to the rear wheel WR. In this modified example, the electronic controller 52 executes, for example, the motor driving control of FIG. 13. The same process as steps S41, S42, S44, S45, S46, S49 and S50 of FIG. 12 is performed in steps S41, S42, S44, S45, S46, S49 and S50 of FIG. 13. In the motor driving control of FIG. 13, step S51 is performed instead of step S43, step S52 is performed instead of step S47, and step S53 is performed instead of step S48. In step S51, the electronic controller 52 sets the fourth predetermined speed VX4 in accordance with the inclination angle DA. In step S52, the electronic controller 52 sets the fourth predetermined speed VX4 in accordance with the inclination angle DA. In step S53, the electronic controller 52 sets the fourth predetermined speed VX4 to zero. The process of step S53 stops the assist of the motor 32 in a case where the road surface is downwardly sloped.

Chart 2, which is used in the first embodiment of the control for driving the motor 32, can be changed to chart 7. In this case, the second predetermined speed VX2 corresponding to the absolute value of each inclination angle DA is the same in a case where the inclination angle DA is greater than zero and in a case where the inclination angle DA is less than zero.

CHART 7

| Inclination Angle DA (degree) | Predetermined Speed VX2 (km/h) |
|---|---|
| 0 ≤ \| DA \| < 2 | 5 |
| 0 ≤ \| DA \| < 4 | 4 |
| 4 ≤ \| DA \| < 6 | 3 |
| 6 ≤ \| DA \| < 8 | 2 |
| 8 ≤ \| DA \| | 1 |

The electronic controller 52 can change the predetermined speeds VX1, VX2, VX3 and VX4 based on a usage environment other than the inclination angle DA instead of or in addition to the inclination angle DA. The usage environment other than the inclination angle DA includes an ambient temperature or illuminance. In this case, the detection unit 62 can include a sensor that detects at least one of the ambient temperature or illuminance. For example, in a case where the ambient temperature is decreased, the electronic controller 52 lowers the predetermined speeds VX1, VX2, VX3 and VX4. For example, the electronic controller 52 lowers the predetermined speeds VX1, VX2, VX3 and VX4 as the ambient temperature is decreased. A low ambient temperature may freeze the road surface. The changes in the predetermined speeds VX1, VX2, VX3 and VX4 in accordance with the ambient temperature contribute to the usability. For example, in a case where the illuminance is decreased, the electronic controller 52 lowers the predetermined speeds VX1, VX2, VX3 and VX4. For example, the electronic controller 52 lowers the predetermined speeds VX1, VX2, VX3 and VX4 as the illuminance is decreased. Low illuminance may hinder the view of the traveling path. The changes in the predetermined speeds VX1, VX2, VX3 and VX4 in accordance with the ambient illuminance of the bicycle 10 contribute to the usability.

In the first to third embodiments, the detection unit 62 can detect the inclination angle DA in one or two directions. The inclination angle DA in one or two directions includes at least the pitch angle among the pitch angle, the roll angle, and the yaw angle. In this case, the gyroscope 62B of the inclination sensor 62A can be changed to a one-axis or two-axis gyroscope 62B. Also, the acceleration sensor 62C can be changed to a one-axis or two-axis acceleration sensor 62C.

The detection unit 62 can include a global positioning system (GPS) receiver instead of or in addition to the inclination sensor 62A. In this case, the electronic controller 52 calculates the inclination angle DA of the road surface by comparing a signal received by the GPS receiver with map data that is obtained through the Internet or the like or map data that is stored in memory 54 in advance.

The detection unit 62 can include a reception portion that receives information from an external potable communication device such as a smartphone instead of or in addition to the inclination sensor 62A. In this case, the detection unit 62 receives information from the portable communication device that is related to at least one of the usage environment of the bicycle 10 and the posture of the bicycle 10, which is obtained by the portable communication device. If the rider of the bicycle 10 carries a portable communication device, the inclination angle DA of the bicycle 10 can be calculated based on the inclined angle of the portable communication device.

In the above modified example, in which information is received from a portable communication device, the predetermined speeds VX1, VX2, VX3 and VX4 can be set in accordance with at least one of the usage environment of the bicycle and the posture of the bicycle that are detected by the portable communication device. The set predetermined speeds VX1, VX2, VX3 and VX4 can be sent to the electronic controller 52. In this case, the electronic controller 52 controls the motor 32 based on the received predetermined speeds VX1, VX2, VX3 and VX4.

In each embodiment, the motor 32 can be provided on the frame 12 of the bicycle 10, the rear wheel WR, or a front wheel WF. In a case where the motor 32 is provided on the front wheel WF, the motor 32 is provided on a hub of the front wheel WF to transmit rotation to the front wheel WF. In a case where the motor 32 is provided on the rear wheel WR, the motor 32 is provided on a hub of the rear wheel WR to transmit rotation to the rear wheel WR.

What is claimed is:

1. A bicycle control device comprising:
    an electronic controller that controls a motor, which assists with propulsion of a bicycle, the electronic controller having a memory,
    the electronic controller being configured to control the motor so that the motor assists with propulsion of the bicycle in a case where a detected value of a traveling speed of the bicycle is less than or equal to a predetermined speed, the predetermined speed being a threshold speed in accordance with which the control of the motor is changed, the predetermined speed being stored in the memory, the electronic controller being configured to stop the motor in a case where the detected traveling speed of the bicycle is over the predetermined speed that is stored in the memory, and
    the electronic controller being configured to change the predetermined speed that is stored in the memory in accordance with at least one of a usage environment of the bicycle and a posture of the bicycle.

2. The bicycle control device according to claim 1, wherein
    the usage environment includes an inclination angle of a road surface on which the bicycle travels.

3. The bicycle control device according to claim 2, wherein
    the predetermined speed is lowered as an absolute value of the inclination angle is increased.

4. The bicycle control device according to claim 2, wherein
    the inclination angle of the road surface includes an inclination angle with respect to a horizontal plane in a direction in which the bicycle travels.

5. The bicycle control device according to claim 1, wherein
    the posture includes an inclination angle of the bicycle.

6. The bicycle control device according to claim 5, wherein
    the inclination angle of the bicycle includes an inclination angle with respect to a horizontal plane in a front-rear direction of the bicycle.

7. The bicycle control device according to claim 4, wherein
    the electronic controller is configured to lower the predetermined speed in a case where the inclination angle is a predetermined angle that is greater than zero as compared to a case where the inclination angle is zero.

8. The bicycle control device according to claim 4, wherein
    the electronic controller is configured to lower the predetermined speed as the inclination angle increases in a case where the inclination angle is greater than zero.

9. The bicycle control device according to claim 4, wherein
    the electronic controller is configured to lower the predetermined speed in a case where the inclination angle is a predetermined angle that is less than zero as compared to a case where the inclination angle is zero.

10. The bicycle control device according to claim 4, wherein
    the electronic controller is configured to lower the predetermined speed as the inclination angle decreases in a case where the inclination angle is less than zero.

11. The bicycle control device according to claim 2, wherein
    the electronic controller is configured to lower the predetermined speed in a case where the inclination angle is a predetermined angle that has an absolute value that is greater than zero as compared to a case where the absolute value of the inclination angle is zero.

12. The bicycle control device according to claim 2, wherein
    the electronic controller is configured to lower the predetermined speed as an absolute value of the inclination angle increases in a case where the absolute value of the inclination angle is greater than zero.

13. The bicycle control device according to claim 11, wherein
the electronic controller is configured to set the predetermined speed corresponding to the absolute value of the inclination angle to at least partially differs between a case where the inclination angle is greater than zero as compared to a case where the inclination angle is less than zero.

14. The bicycle control device according to claim 1, further comprising
a detection unit configured to detect at least one of the usage environment and the posture of the bicycle,
the electronic controller being configured to change the predetermined speed in accordance with an output of the detection unit.

15. The bicycle control device according to claim 14, wherein
the detection unit includes an inclination sensor that is configured to detect an inclination angle of the bicycle.

16. The bicycle control device according to claim 15, wherein
the inclination sensor is configured to detect a pitch angle of the bicycle.

17. The bicycle control device according to claim 1, wherein
the electronic controller is configured to control the motor in a walk mode, in which walking of the bicycle is assisted, and
the electronic controller is configured to control the motor so that the motor assists with walking of the bicycle in a case where a traveling speed of the bicycle is less than or equal to the predetermined speed in the walk mode.

18. The bicycle control device according to claim 1, wherein
the electronic controller is configured to control the motor in an assist mode, in which propulsion of the bicycle is assisted in accordance with manual driving force that is input to the bicycle, and
the electronic controller is configured to control the motor so that the motor assists with propulsion of the bicycle in a case where a traveling speed of the bicycle is less than or equal to the predetermined speed in the assist mode.

19. A bicycle driving device comprising:
a bicycle control device comprising:
a motor
an electronic controller that controls the motor, which assists with propulsion of a bicycle, the electronic controller having a memory,
a transmission mechanism configured to transmit a rotational force of the motor to a wheel of the bicycle and also configured to transmit a rotational force of the wheel to the motor, the electronic controller being configured to drive the motor so that the motor applies a brake on the bicycle in a case the bicycle is traveling downhill in the walk mode;
the electronic controller being configured to control the motor so that the motor assists with propulsion of the bicycle in a case where a detected value of a traveling speed of the bicycle is less than or equal to a predetermined speed, the predetermined speed being a threshold speed in accordance with which the control of the motor is changed, the predetermined speed being stored in the memory, the electronic controller being configured to stop the motor in a case where the detected traveling speed of the bicycle is over the predetermined speed that is stored in the memory, and
the electronic controller being configured to change the predetermined speed that is stored in the memory in accordance with at least one of a usage environment of the bicycle and a posture of the bicycle.

20. A bicycle driving device comprising:
a bicycle control device comprising:
a motor
an electronic controller that controls the motor, which assists with propulsion of a bicycle, the electronic controller having a memory,
a transmission mechanism configured to transmit a rotational force of the motor to a wheel of the bicycle, the transmission mechanism including a one-way clutch located in a driving force transmission path that extends between the motor and the wheel, and the electronic controller being configured to stop the motor from assisting with walking of the bicycle in a case where the bicycle is traveling downhill in the walk mode;
the electronic controller being configured to control the motor so that the motor assists with propulsion of the bicycle in a case where a detected value of a traveling speed of the bicycle is less than or equal to a predetermined speed, the predetermined speed being a threshold speed in accordance with which the control of the motor is changed, the predetermined speed being stored in the memory, the electronic controller being configured to stop the motor in a case where the detected traveling speed of the bicycle is over the predetermined speed that is stored in the memory, and
the electronic controller being configured to change the predetermined speed that is stored in the memory in accordance with at least one of a usage environment of the bicycle and a posture of the bicycle.

* * * * *